United States Patent
Sakai et al.

(10) Patent No.: US 12,405,285 B2
(45) Date of Patent: Sep. 2, 2025

(54) AUTOMATIC ANALYZER

(71) Applicant: Hitachi High-Tech Corporation, Tokyo (JP)

(72) Inventors: Tatsuya Sakai, Tokyo (JP); Mariko Miyazaki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 205 days.

(21) Appl. No.: 17/925,462

(22) PCT Filed: Feb. 9, 2021

(86) PCT No.: PCT/JP2021/004769
§ 371 (c)(1),
(2) Date: Nov. 15, 2022

(87) PCT Pub. No.: WO2021/245989
PCT Pub. Date: Dec. 9, 2021

(65) Prior Publication Data
US 2023/0184803 A1 Jun. 15, 2023

(30) Foreign Application Priority Data
Jun. 1, 2020 (JP) .................. 2020-095585

(51) Int. Cl.
*G01N 35/10* (2006.01)

(52) U.S. Cl.
CPC ..... *G01N 35/1011* (2013.01); *G01N 35/1002* (2013.01); *G01N 2035/1058* (2013.01)

(58) Field of Classification Search
None
See application file for complete search history.

(56) References Cited

U.S. PATENT DOCUMENTS

| | | | |
|---|---|---|---|
| 4,586,546 A | 5/1986 | Mezei et al. | |
| 2017/0205321 A1 | 7/2017 | Sasaki et al. | |
| 2022/0381799 A1* | 12/2022 | Noda | G01N 35/10 |
| 2022/0397582 A1* | 12/2022 | Miyazaki | G01N 35/1011 |
| 2023/0417789 A1* | 12/2023 | Fukuda | G01N 35/1011 |

FOREIGN PATENT DOCUMENTS

| | | | |
|---|---|---|---|
| JP | 2002340915 A | * | 11/2002 |
| JP | 6381917 B2 | | 8/2018 |
| WO | 2016/136377 A1 | | 9/2016 |

OTHER PUBLICATIONS

Extended European Search Report issued on Apr. 12, 2024 for European Patent Application No. 21817738.4.

* cited by examiner

*Primary Examiner* — P. Kathryn Wright
(74) *Attorney, Agent, or Firm* — Volpe Koenig

(57) ABSTRACT

An object of the present invention is to provide an automatic analyzer capable of efficiently performing stirring by a discharge operation. In the automatic analyzer according to the present invention, by lifting the probe while discharging a specimen or a reagent alter the probe starts to discharge the specimen to a vessel, as a height of a liquid level of the liquid in the vessel, which is discharged from the probe, is gradually raised, a distance between the liquid level in the vessel and a tip end of the probe is gradually increased.

10 Claims, 17 Drawing Sheets

P1: DISCHARGE START, P2: DISPENSING PROBE LIFTING START
P3: DISCHARGE END, DISPENSING PROBE LIFTING STOP

P1: DISCHARGE START, P2: DISPENSING PROBE LIFTING START
P3: DISCHARGE END, DISPENSING PROBE LIFTING STOP

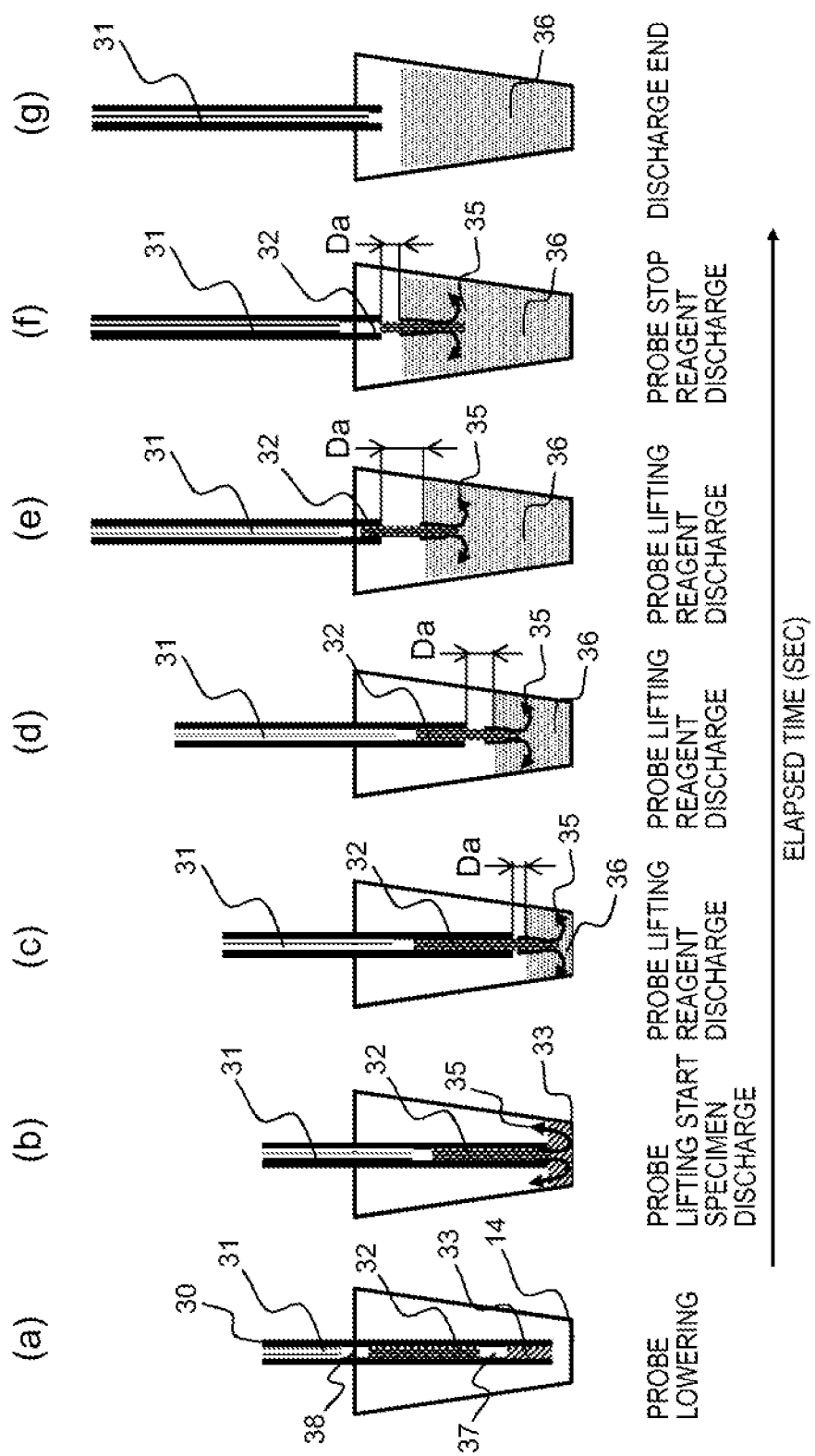

P4: DISCHARGE START, P5: DISPENSING PROBE LIFTING START
P6: DISPENSING PROBE LIFTING STOP, P7: DISCHARGE END

P4: DISCHARGE START, P5: DISPENSING PROBE LIFTING START
P6: DISPENSING PROBE LIFTING STOP, P7: DISCHARGE END

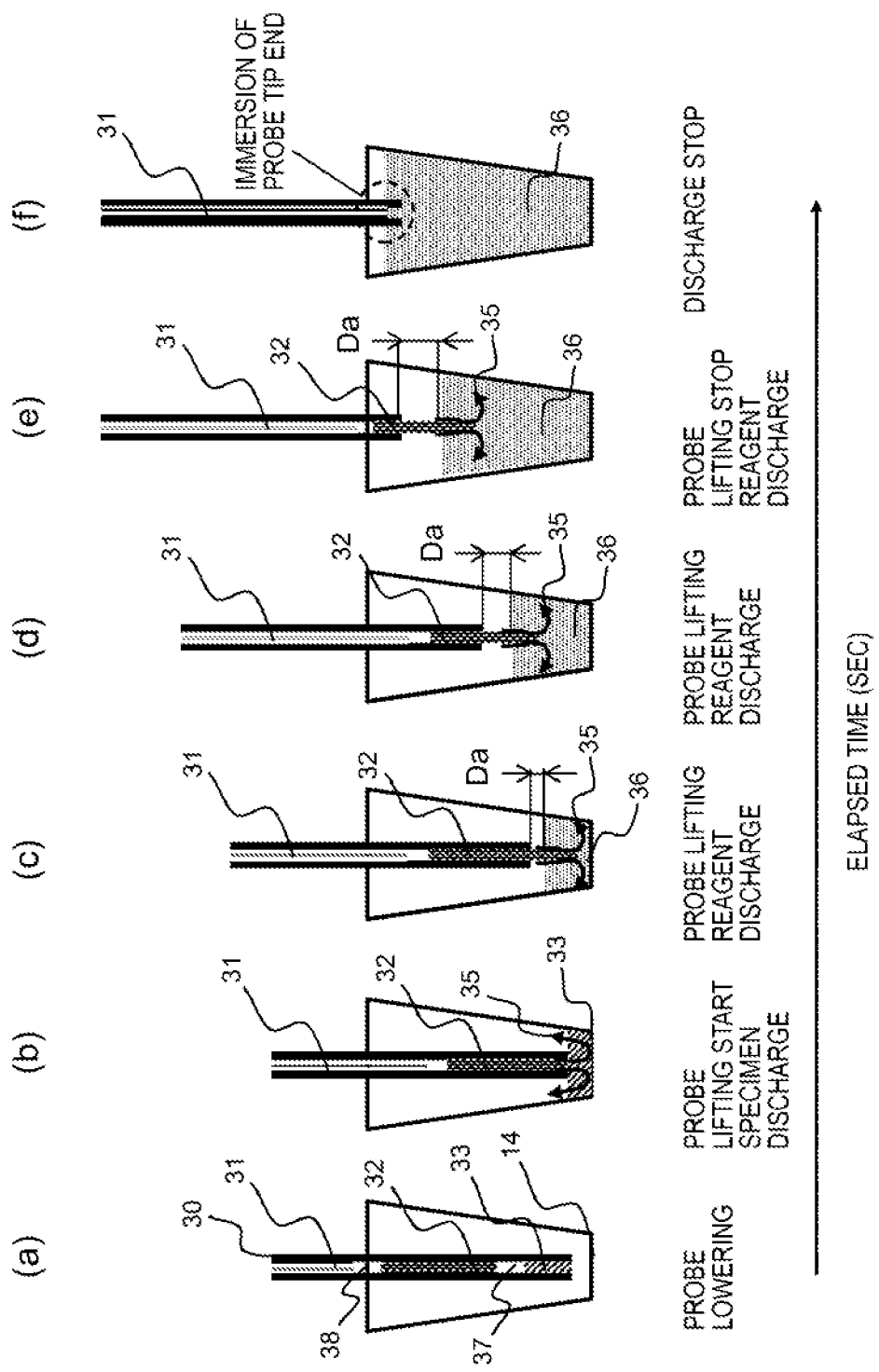

P8: DISCHARGE START, P9: DISPENSING PROBE LIFTING START
P10: DISPENSING PROBE LIFTING STOP, P11: DISCHARGE END

P8: DISCHARGE START, P9: DISPENSING PROBE LIFTING START
P10: DISPENSING PROBE LIFTING STOP, P11: DISCHARGE END

P12: DISCHARGE START, P13: DISPENSING PROBE LIFTING START
P14: DISPENSING PROBE LIFTING STOP, P15: DISCHARGE END

P12: DISCHARGE START, P13: DISPENSING PROBE LIFTING START
P14: DISPENSING PROBE LIFTING STOP, P15: DISCHARGE END

P16: DISCHARGE START, P17: DISPENSING PROBE LIFTING START
P18: DISPENSING PROBE LIFTING STOP, P19: DISCHARGE END

P16: DISCHARGE START, P17: DISPENSING PROBE LIFTING START
P18: DISPENSING PROBE LIFTING STOP, P19: DISCHARGE END

P20: DISCHARGE START, P21: DISPENSING PROBE LIFTING START
P23: DISPENSING PROBE LIFTING STOP, P24: DISCHARGE END

P20: DISCHARGE START, P21: DISPENSING PROBE LIFTING START
P23: DISPENSING PROBE LIFTING STOP, P24: DISCHARGE END

AUTOMATIC ANALYZER

TECHNICAL FIELD

The present invention relates to an automatic analyzer.

BACKGROUND ART

Examples of an automatic analyzer that analyzes components of blood, urine, spinal fluid, and the like of a patient include (a) a biochemical automatic analyzer that measures an amount of transmitted light or scattered light obtained by irradiating a reaction liquid of a specimen and a reagent with light, and (b) an immune automatic analyzer in which a reagent added with a label reacts with a specimen and an amount of light emitted from the label is measured. A technique for preventing liquid scattering when a liquid is discharged from a probe to a reaction vessel is disclosed in these automatic analyzers (see PTL 1).

CITATION LIST

Patent Literature

PTL 1: Japanese Patent No. 6381917

SUMMARY OF INVENTION

Technical Problem

According to PTL 1, a probe discharges a liquid while the probe is immersed in a liquid of several millimeters. A liquid level above a tip end of the probe and a liquid flow around the tip end of the probe are poor, and it is not clear whether the liquid can be stirred efficiently by a discharge operation.

An object of the invention is to provide an automatic analyzer capable of efficiently stirring a liquid by a discharge operation.

Solution to Problem

In the automatic analyzer according to the invention, after a probe starts to discharge a specimen to a vessel, the probe is lifted while discharging the specimen or a reagent, so that a height of a liquid level of a liquid in the vessel discharged from the probe increases, and a distance between the liquid level in the vessel and a tip end of the probe gradually increases.

Advantageous Effects of Invention

According to the invention, stirring can be efficiently performed by a discharge operation.

BRIEF DESCRIPTION OF DRAWINGS

FIG. 7 is a diagram schematically illustrating a movement of the dispensing probe 30 and an effect thereof when the automatic analyzer 10 simultaneously dispenses a specimen and a first reagent in a second embodiment.

FIG. 9 is a diagram schematically illustrating a movement of the dispensing probe 30 and an effect thereof when the automatic analyzer 10 simultaneously dispenses a specimen and a first reagent in a third embodiment.

DESCRIPTION OF EMBODIMENTS

Figure 1:
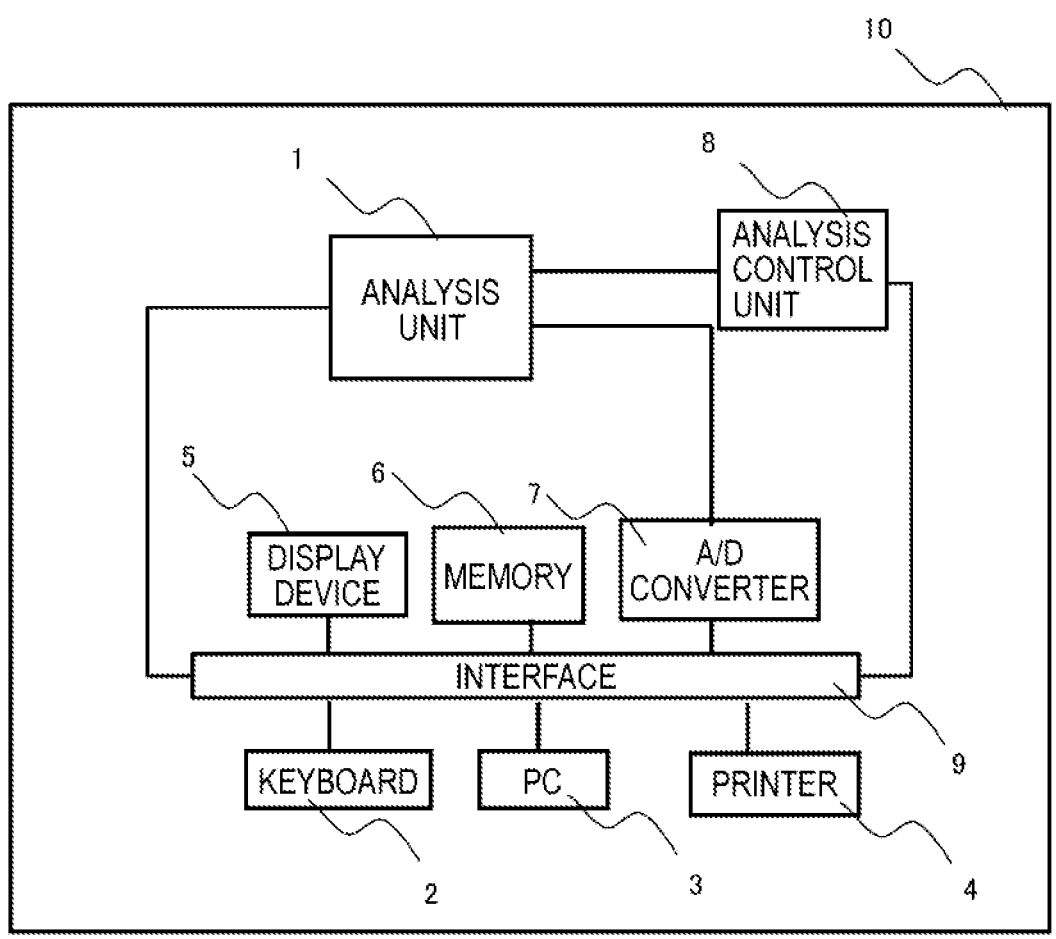
FIG. 1 is a block diagram schematically illustrating an overall view of an automatic analyzer 10 according to a first embodiment.

Embodiments of the invention will be described in detail with reference to the drawings. In the drawings, common components or similar components are denoted by the same reference numerals, and repetitive description thereof will be omitted as appropriate. In the following embodiments, it is needless to say that components (including element steps and the like) are not necessarily essential unless otherwise particularly specified or clearly considered as essential in principle.

First Embodiment

FIG. 1 is a block diagram schematically illustrating an overall configuration of an automatic analyzer 10 according to a first embodiment. The automatic analyzer 10 mainly includes an analysis unit 1 that analyzes a mixed liquid of a liquid specimen and a reagent, a computer 3 (a control unit) that controls the analysis unit 1, and an analysis control unit 8.

The analysis control unit 8 controls an operation of each mechanism of the analysis unit 1. Details will be described later. The computer 3 is connected to the analysis control unit 8, an A/D converter 7, and the like via an interface 9. The computer 3 sends a command to the analysis control unit 8 or the like and controls an operation of each mechanism. A/D-converted data (a photometric value) acquired from the analysis unit 1 is sent to the computer 3. The computer 3 executes calculation processing using the acquired data (the photometric value). That is, the computer 3 can control each mechanism of the analysis unit 1 via the analysis control unit 8, and can perform data calculation processing.

The interface 9 is connected to a printer 4 for printing, a memory 6 that is a recording device, a keyboard 2 for inputting an operation command and the like, and a display device 5 implemented by a CRT display, a liquid crystal display or the like. The memory 6 includes, for example, a hard disk memory or an external memory. The memory 6 records information such as an analysis parameter, an analysis item request, a calibration result, and an analysis result.

Figure 2:
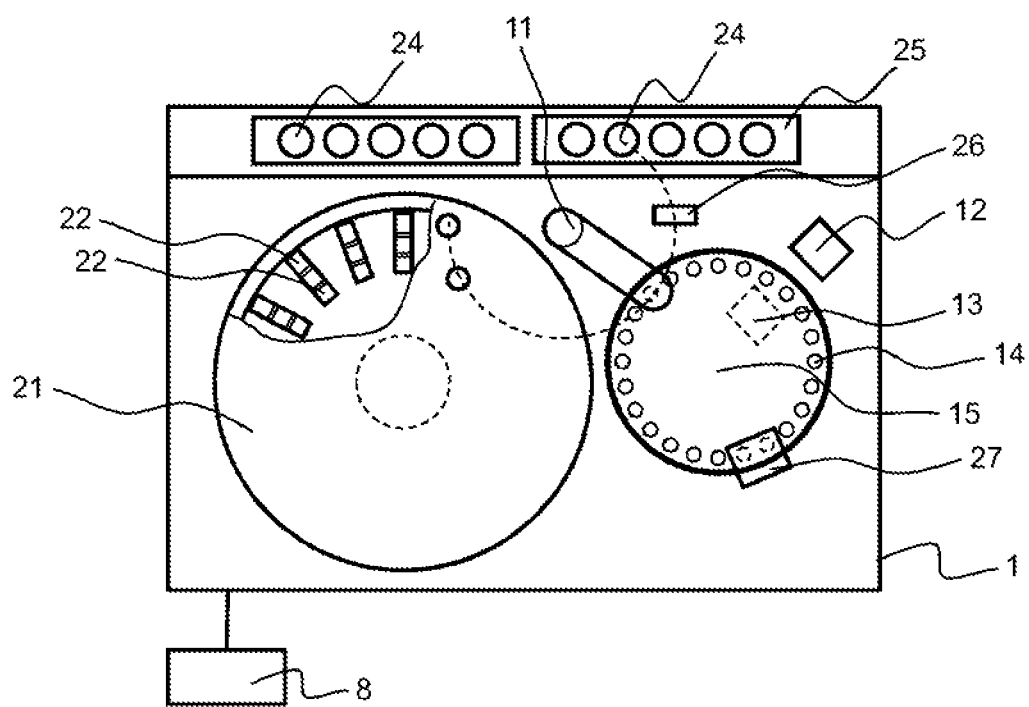
FIG. 2 is a plan view schematically illustrating a configuration of an analysis unit 1.

FIG. 2 is a plan view schematically illustrating a configuration of the analysis unit 1. The analysis unit 1 mainly includes sample racks 25, a reagent disk 21, and a reaction disk incubator) 15. The sample rack 25 holds a specimen vessel 24. The reagent disk 21 holds a reagent vessel 22. The reaction disk 15 holds a reaction vessel 14 on its circumference. The analysis unit 1 further includes a dispensing mechanism 11, a dispensing mechanism washing unit 26, a reaction vessel washing unit 27, a light source 12, and a spectroscopic detector 13.

The sample rack 25 is movable in a horizontal direction, and a plurality of the specimen vessels 24 for holding biological samples (hereinafter referred to as specimens) such as blood are placed on the sample rack 25.

The reagent disk 21 can intermittently rotate clockwise and counterclockwise, and a plurality of the reagent vessels 22 corresponding to analysis items of the automatic analyzer 10 are placed on the reagent disk 21. In FIG. 2, the reagent disk 21 is illustrated in a manner of being partially cut away. The reagent disk 21 has a circular shape in a plan view, in the reagent disk 21, two reagent vessels 22 are arranged in a radial direction of the reagent disk 21 (two reference numerals 22 at two ends are illustrated). That is, two circular rows of the reagent vessels 22 arranged in a manner of surrounding the center of the reagent disk 21 are concentrically disposed in the reagent disk 21. Reagents in the two reagent vessels 22 arranged in the radial direction may be reagents of different types.

The reaction disk 15 can intermittently rotate clockwise and counterclockwise, and a plurality of the reaction vessels 14 in which a specimen and a reagent reacts with each other are placed on a circumference of the reaction disk 15.

The dispensing mechanism 11 aspirates a specimen from the specimen vessel 24 placed on the sample rack 25, aspirates a reagent from the reagent vessel 22 in the reagent disk 21, and discharges and dispenses an aspirated liquid into the reaction vessel 14 in the reaction disk 15. The dispensing mechanism 11 does not only indicate a tip end portion of a vessel constituting a flow path for aspirating and discharging a liquid, but also indicates a vessel around the entire flow path from a pump (for example, a syringe) for aspirating and discharging a liquid to the tip end portion. FIG. 2 illustrates a vertical rotation operation unit (a movement unit) of the dispensing mechanism 11. The vertical rotation operation unit is an operation unit that changes a position where a liquid is aspirated and discharged.

The light source 12 is disposed in the vicinity of an outer periphery of the reaction disk 15, and emits light to the reaction vessel 14. The spectroscopic detector 13 is disposed at an opposite side to the light source 12 with the reaction vessel 14 interposed between the spectroscopic detector 13 and the light source 12, and optically measures light absorbance of light emitted from the light source 12 to a specimen, a reagent, or a mixed liquid of a specimen and a reagent in a reaction vessel. At a timing when the reaction vessel 14 crosses a predetermined optical path, the light source 12 emits light to each of the plurality of reaction vessels 14 that are moved accompanying with a rotational movement of the reaction disk 15. Through the light emission, the spectroscopic detector 13 detects light transmitted through a specimen, a reagent, or a mixed liquid of a specimen and a reagent stored in each of the reaction vessels 14 for each wavelength of a test item. An analog signal such as an intensity of light detected by the spectroscopic detector 13 is input to the A/D converter 7 (see FIG. 1). The A/D converter 7 generates standard data or test data based on an input digital signal, and the generated data are sent to the computer 3.

The reaction vessel washing unit 27 washes an inner side of each of the plurality of reaction vessels 14 for which a measurement performed by the spectroscopic detector 13 is completed.

Although not particularly illustrated, the analysis unit 1 may include a stirring mechanism that stirs a liquid in a reaction vessel. Examples of the stirring mechanism include a method in which a spatula is immersed in a solution in the reaction vessel 14 and the spatula is rotated to physically stir the solution, and a method in which ultrasonic waves are radiated to the solution to generate a swirling flow.

The analysis control unit 8 controls operations of a plurality of units constituting the analysis unit 1. The analysis control unit 8 controls rotational movements of the reagent disk 21 and the reaction disk 15 by driving a movement mechanism such as a disk. The analysis control unit 8 controls a horizontal movement of the sample rack 25 by driving a belt pulley mechanism or a ball screw mechanism. The analysis control unit 8 controls a vertical movement and a rotational movement of the dispensing mechanism 11 by driving an arm movement mechanism. The analysis control unit 8 controls a vertical movement of the reaction vessel washing unit 27 by driving a lifting and lowering mechanism. The analysis control unit 8 controls an aspirating and discharge operation of various pumps which will be described later with reference to FIG. 3) connected to the dispensing mechanism 11, and controls a liquid feeding and stopping operation of a pump that supplies washing water to the reaction vessel washing unit 27.

Figure 3:
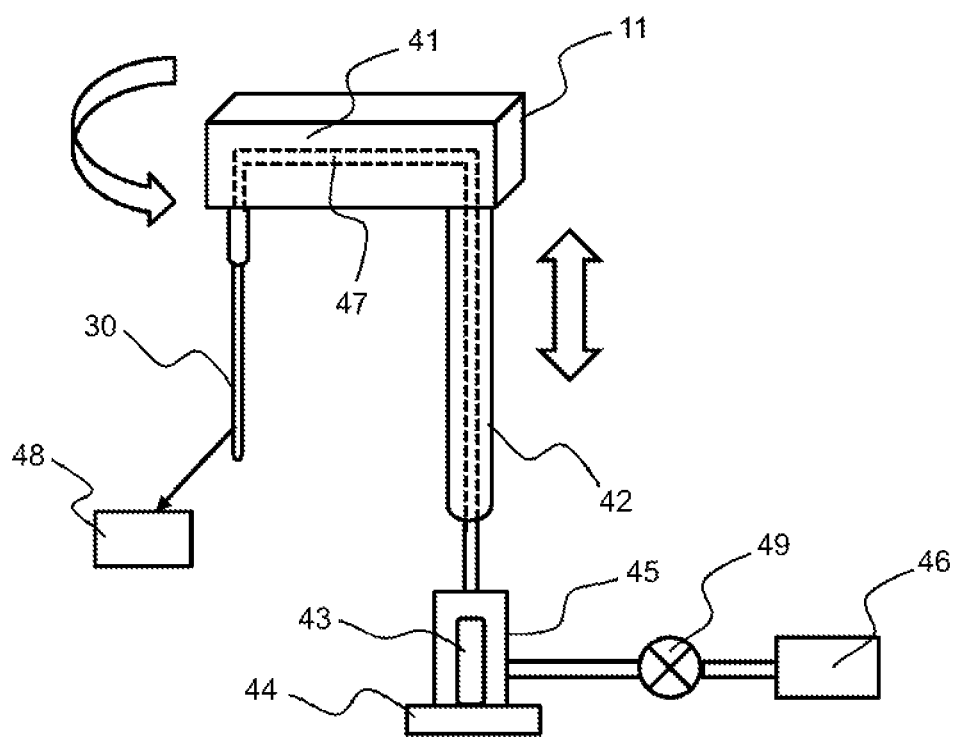
FIG. 3 is a schematic view of a dispensing mechanism 11.

FIG. 3 is a schematic view of the dispensing mechanism 11. The dispensing mechanism 11 includes a dispensing probe 30, a dispensing arm 41, and a vertical rotation operation unit 42. The dispensing probe 30 is attached to one end of the dispensing arm 41, and the dispensing arm 41 is coupled to the dispensing probe 30 and the vertical rotation operation unit 42. The vertical rotation operation unit 42 includes a biaxial movement mechanism of a vertical (vertical direction) movement mechanism and a rotation movement mechanism. The dispensing mechanism 11 can be vertically moved and rotationally moved by the vertical rotation operation unit 42. As a result, the dispensing mechanism 11 can move to a reagent aspirating position where the reagent vessel 22 (see FIG. 2) is installed in order to aspirate a reagent, can move to a specimen aspirating position where the specimen vessel 24 (see FIG. 2) is installed in order to aspirate a specimen, and can move to a specimen and reagent discharging position where the reaction vessel 14 is installed in order to discharge the aspirated specimen and reagent. A tip end of the dispensing probe 30 can move to a position of the dispensing mechanism washing unit 26 (see FIG. 2) where the tip end of the dispensing probe 30 is washed with washing water or the like. The vertical rotation operation unit 42 is controlled by the analysis control unit 8 (see FIGS. 1 and 2).

A dispensing flow path 47 is a flow path of the dispensing mechanism 11 that passes through an inner side of the dispensing arm 41 and an inner side of the vertical rotation operation unit 42. The dispensing probe 30 is connected to a metering pump 45 via the dispensing flow path 47 in the dispensing arm 41. The metering pump 45 includes a plunger 43 and a drive unit 44, and is connected to a pump 46 via a valve 49. The metering pump 45 is controlled by the analysis control unit 8 (see FIGS. 1 and 2).

An aspiration operation and a discharge operation of the dispensing mechanism 11 are performed by moving up and down the plunger 43 fixed to the metering pump 45 (a reciprocating motion of the plunger 43). A working fluid (for example, pure water) or the like is filled from the tip end of the dispensing probe 30 to the metering pump 45 and the pump 46 through the dispensing flow path 47. The dispensing mechanism 11 includes a liquid level detector 48 that detects a liquid level of a specimen, a reagent, and a mixed liquid of a specimen and a reagent. The liquid level detector 48 detects a liquid level according to, for example, a change in capacitance caused by the liquid level being brought into contact with the dispensing probe 30.

Figure 4:
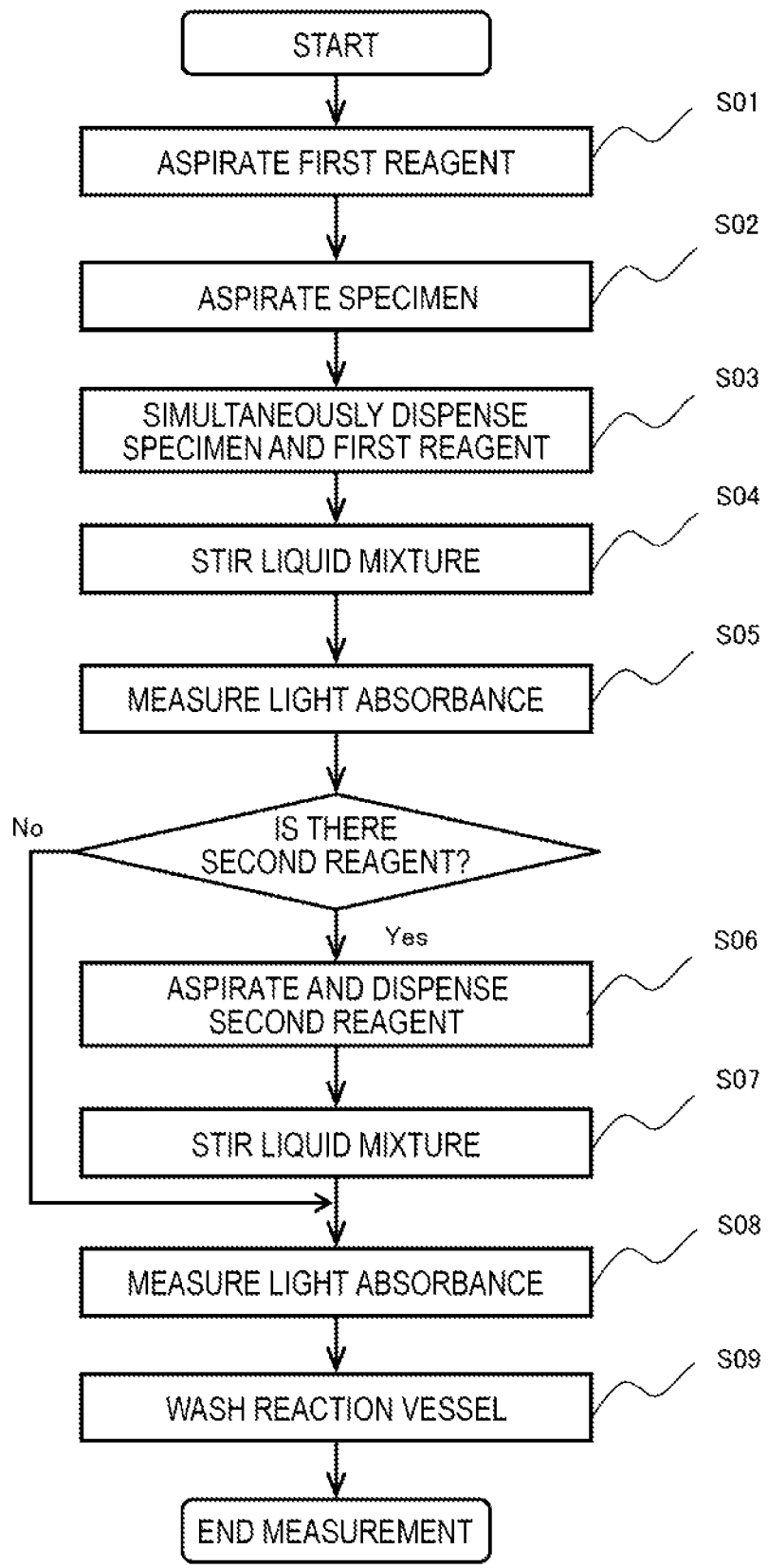
FIG. 4 is a flowchart illustrating a measurement operation of the automatic analyzer 10.

FIG. 4 is a flowchart illustrating a measurement operation of the automatic analyzer 10. A series of analysis operations in the automatic analyzer 10 will be described with reference to FIG. 4.

(FIG. 4: Step S01: Preliminary Operation)

When the analysis unit 1 receives an analysis operation start command from the computer 3 via the interface 9, the reaction vessel washing unit 27 starts to wash the reaction vessel 14, and a water blank is measured using pure water discharged from the reaction vessel washing unit 27. A water blank measurement value serves as a reference of light absorbance to be measured in the reaction vessel 14 thereafter. When the washed reaction vessel 14 is moved to a dispensing position in a circumference of the dispensing mechanism 11 in a rotation direction by an operation of the reaction disk 15 in one cycle (that is, repetition of an intermittent operation of moving the reaction disk 15 for a certain distance and temporarily stopping the reaction disk 15), the specimen vessel 24 is moved to a specimen dispensing position in the circumference of the dispensing mechanism 11 in the rotation direction by a horizontal operation of the sample rack 25. At the same time, the reagent disk 21 is rotated so that the reagent vessel 22 of a corresponding analysis item is positioned at a reagent aspirating position in the circumference of the dispensing mechanism 11 in the rotation direction.

(FIG. 4: Step S01)

The dispensing mechanism 11 aspirates air from the air to form an air layer at the tip end of the dispensing probe 30. The air layer is an air layer that is provided to prevent a working fluid (for example, pure water) filled in the dispensing flow path 47 from the tip end of the dispensing probe 30 and a reagent to be aspirated subsequently from the reagent vessel 22 from being mixed in the dispensing probe 30. Thereafter, when the dispensing mechanism 11 is moved to a reagent dispensing position by the rotational movement and the vertical movement, the dispensing mechanism 11 aspirates a reagent from the reagent vessel 22 into the dispensing probe 30.

(FIG. 4: Step S02)

After the reagent is aspirated, the dispensing mechanism 11 is moved to a position in the air by the vertical movement, and aspirates air to form an air layer at the tip end of the dispensing probe 30. The air layer is an air layer that is provided to prevent a specimen to be aspirated subsequently from the specimen vessel 24 from being mixed with the reagent in the dispensing probe 30. Then, the dispensing mechanism 11 is moved to the dispensing mechanism washing unit 26 by the rotational movement and the vertical movement, and the tip end of the dispensing probe 30 is washed with washing water. After the dispensing probe 30 is washed, when the dispensing mechanism 11 is moved to the specimen aspirating position by the rotational movement and the vertical movement, the dispensing mechanism 11 aspirates a specimen from the specimen vessel 24 into the dispensing probe 30.

(FIG. 4: Step S03)

After the specimen is aspirated, the dispensing mechanism 11 is moved to the dispensing mechanism washing unit 26 by the rotational movement and the vertical movement, and the tip end of the dispensing probe 30 is washed with washing water. Next, the dispensing mechanism 11 is moved to the dispensing position by the rotational movement and the vertical movement, and simultaneously dispenses the specimen and the reagent into the reaction vessel 14 by a predetermined amount. Details of dispensing the specimen and the reagent will be described later.

(FIG. 4: Step S04)

After the specimen and the reagent are dispensed, in order to stir a mixed liquid of the specimen and the reagent in the reaction vessel 14, the dispensing mechanism 11 aspirates a predetermined amount of the mixed liquid, and then discharges the mixed liquid into the reaction vessel 14 again. Accordingly, the mixed liquid is stirred. An operation of performing the aspiration and discharge operations again after the specimen and the reagent are discharged is hereinafter referred to as pipette stirring. Although not particularly illustrated, a stirring operation of a stirring mechanism other than the pipette stirring may be performed. For example, the stirring mechanism is a stirring mechanism having functions such as performing stirring by rotation of a spatula immersed in a reaction liquid or performing stirring by a swirling flow generated by radiating ultrasonic waves. In a case where stirring can be sufficiently performed simply by an operation of simultaneously discharging the specimen and the reagent by the dispensing mechanism 11, it is not particularly necessary to use the stirring operations described above. The dispensing mechanism 11 is moved to the dispensing mechanism washing unit by the vertical movement and the rotational movement and the tip end of the dispensing probe 30 is washed with washing water to prepare for a subsequent dispensing operation.

(FIG. 4: Step S05)

After the specimen and the reagent are dispensed or stirred, a measurement to be performed by the spectroscopic detector 13 is started. Photometry is performed when the reaction vessel 14 crosses a light beam during the reaction disk 15 is in rotation. The spectroscopic detector 13 performs photometry for the same reaction vessel 14 for a plurality of times at a time interval determined for each analysis item.

(FIG. 4: Step S06)

Depending on an analysis item, there is an item to which a second reagent is added. In this case, the reagent disk 21 is rotated so that the reagent vessel 22 of a corresponding analysis item is positioned at a reagent aspirating position in the circumference of the dispensing mechanism 11 in the rotation direction after a certain period of time is elapsed from when the specimen and a first reagent are discharged. The dispensing mechanism 11 is moved to the reagent aspirating position by the vertical movement and the rotational movement. The dispensing mechanism 11 aspirates air in the air to form an air layer at the tip end of the probe. The air layer is an air layer that is provided to prevent a working fluid (for example, pure water) filled in the dispensing flow path 47 from the tip end of the dispensing probe 30 and the second reagent to be aspirated subsequently from the reagent vessel 22 from being mixed in the dispensing probe 30. Thereafter, when the dispensing mechanism 11 is moved to the reagent dispensing position by the rotational movement and the vertical movement, the dispensing mechanism 11 aspirates the second reagent from the reagent vessel into the dispensing probe 30. The dispensing mechanism 11 is moved to the dispensing mechanism washing unit 26 by the rotational movement and the vertical movement, and the tip end of the dispensing probe 30 is washed with washing water. Next, the dispensing mechanism 11 is moved to the dispensing position by the rotational movement and the vertical movement, and dispenses the second reagent into the reaction vessel 14 by a predetermined amount.

(FIG. 4: Step S07)

Subsequently, a mixed liquid hi the reaction vessel 14 is stirred by pipette stirring or a stirring mechanism using a spatula, ultrasonic waves, or the like. When stirring can be sufficiently performed simply by an operation of discharging the second reagent by the dispensing mechanism 11, the stirring operations described above may not be used.

(FIG. 4: Step S08)

After the second reagent is dispensed or after the stirring is performed, a measurement performed by the spectroscopic detector 13 continues to be performed.

(FIG. 4: Step S09)

After a predetermined time is elapsed, the reaction vessel washing unit 27 discharges a reaction liquid in the reaction vessel 14 for which the measurement is completed, thereby washing the reaction vessel 14 to prepare for a subsequent measurement. During these operations including the washing, another reaction vessel 14 performs an analysis operation (dispensing, photometry operation, or the like) in parallel using another specimen and another reagent. The computer 3 calculates a concentration and an enzyme activity value based on an obtained measurement value (light absorbance). The calculated concentration and enzyme activity value are stored in the memory 6 using the interface 9. In addition, a result is reported to a user using the display device 5. Through the above operations, the analysis operation performed by the automatic analyzer 10 is ended.

Figure 5:
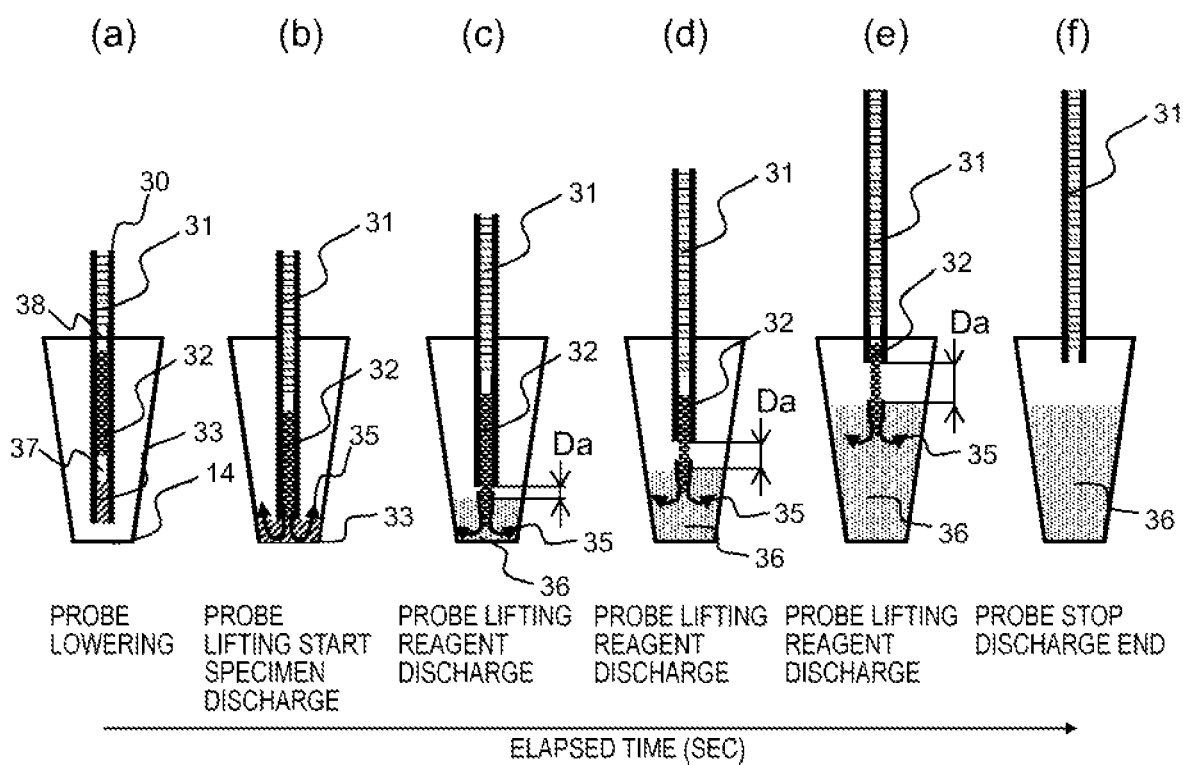
FIG. 5 is a diagram schematically illustrating a movement of a dispensing probe 30 and an effect thereof when the automatic analyzer 10 simultaneously dispenses a specimen and a first reagent in the first embodiment.

FIG. 5 is a diagram schematically illustrating a movement of the dispensing probe 30 and its effect when the automatic analyzer 10 simultaneously dispenses the specimen and the first reagent in the first embodiment. FIG. 5 illustrates an operation of the dispensing probe 30 in step S03. Lowercase alphabets in FIG. 5 indicate a time flow of the operation at the time of discharging in the order of (a), (b), (c), (d), (e), and (f), and the diagrams schematically illustrate respective situations at the time of discharging at an elapsed time. Similarly, in other drawings to be described below, lowercase alphabets indicate a time flow of the discharge operation.

First, the analysis control unit 8 lowers the dispensing mechanism 11 to the vicinity of the bottom of the reaction vessel 14 ((a) in FIG. 5). It is preferable that a position at which the dispensing probe 30 is lowered into the reaction vessel 14 is about several millimeters front the bottom of the reaction vessel 14. A reason for this will be described later. In the first embodiment, a distance from the bottom of the reaction vessel to the tip end of the dispensing probe 30 is set to about 1 mm to 2 mm. At this time, a specimen 33, a reagent 32, and system water 31 (pure water or the like) are held in the dispensing probe 30. Liquids in the dispensing probe 30 have a positional relationship with a positional relationship of the specimen 33, the reagent 32, and the system water 31 in the order frons a tip end side to an upper side of the dispensing probe 30 in the vertical direction. A layer of segmented air 37 is present between the specimen 33 and the reagent 32, and this is provided to prevent the specimen 33 and the reagent 32 from being mixed in the dispensing probe 30. Similarly, a layer of segmented air 38 is present between the reagent 32 and the system water 31, and this is provided to prevent the reagent 32 and the system water 31 from being mixed in the dispensing probe 30. When an operation of simultaneously discharging the specimen 33 and the reagent 32 is started in this slate, a liquid is discharged from the tip end of the dispensing probe 30 to the reaction vessel 14 in the order of the specimen 33, the segmented air 37 (the layer between the specimen 33 and the reagent 32), and the reagent 32.

Next, the analysis control unit 8 starts the discharge operation. First, the specimen 33 is discharged from the tip end of the dispensing probe 30. Then, the analysis control unit 8 controls the dispensing probe 30 to start a lifting operation at the same time as the start of the discharge operation or after several milliseconds (for example, before the tip end of the dispensing probe 30 is immersed in the discharged specimen 33 in the reaction vessel 14) ((h) FIG. 5).

Subsequently, the analysis control unit 8 controls the lifting operation and the discharge operation of the dispensing probe 30 until the specimen and the reagent are discharged at a specified amount. In addition, the analysis control unit 8 controls a lifting speed of the dispensing probe 30 so that a distance Da between the tip end of the dispensing probe 30 and a liquid level of a reaction liquid 36 in the reaction vessel 14 increases with an elapsed time ((c), (d), and (e) in FIG. 5).

When discharging of the specimen and the reagent at a specified amount is completed, the analysis control unit 8 ends the discharge operation, and the lifting operation of the dispensing mechanism 11 ((f) in FIG. 5).

The analysis control unit 8 records data of a correspondence relationship between a total discharge amount of the specimen 33 and the reagent 32 (a height of the liquid level of the reaction liquid 36 discharged into the reaction vessel 14) and a drive pulse and a lifting speed that provide a lifting amount of the dispensing probe 30. The data is set based on known data such as a dimension of the reaction vessel 14 and a time change (a discharge speed) of a discharge amount. For example, in the first embodiment, the lifting speed and the drive pulse of the dispensing probe 30 are applied so that a change rate a of the distance Da between the tip end of the dispensing probe 30 and the height of the liquid level of the reaction liquid 36 (a slope when a horizontal axis represents an elapsed time and a vertical axis represents the distance Da) is 8.0 m/s. The analysis control unit 8 controls the lifting speed of the dispensing probe 30 according to a total discharge amount of the dispensing probe 30 so that the change rate a is constant or changes freely.

Figure 6A:
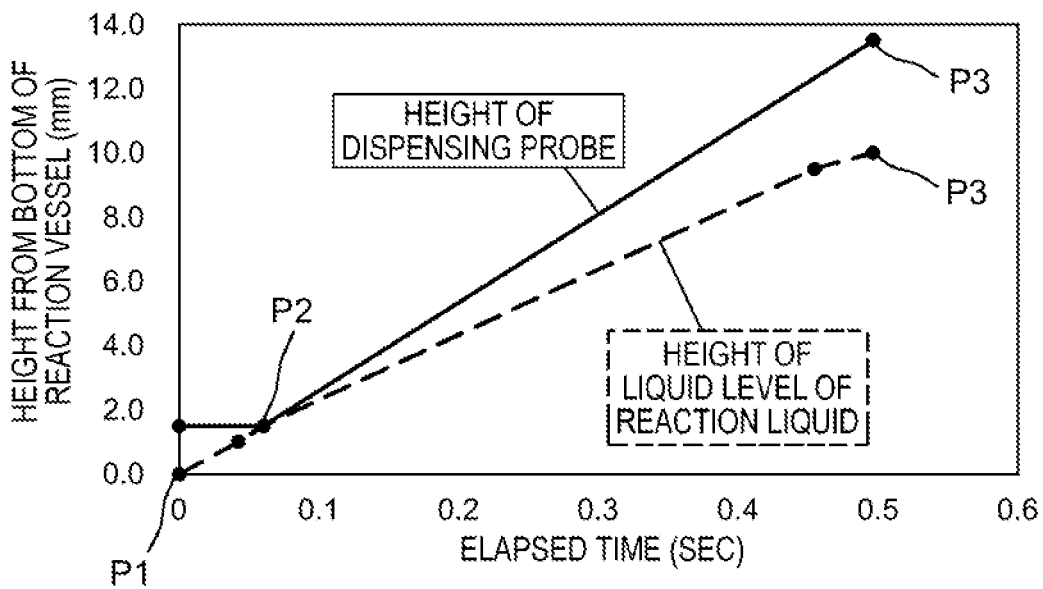
FIG. 6A is a relationship diagram between a height of a tip end of the dispensing probe 30 from the bottom of a reaction vessel 14 and a height of a liquid level of a reaction liquid 36.
Figure 6B:
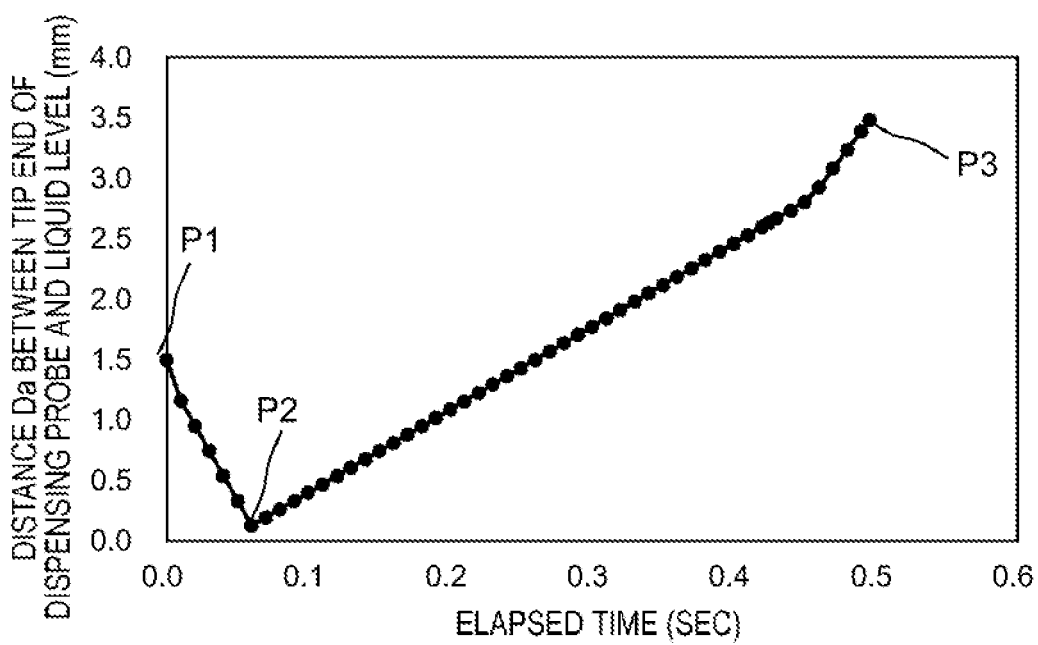
FIG. 6B is a diagram illustrating an elapsed time change in a distance Da between the tip end of the dispensing probe 30 and the liquid level of the reaction liquid 36.

FIG. 6A is a relationship diagram between the height of the tip end of the dispensing probe 30 from the bottom of the reaction vessel 14 and the height of the liquid level of the reaction liquid 36. FIG. 6B illustrates an elapsed time change in the distance Da between the tip end of the dispensing probe 30 and the liquid level of the reaction liquid 36. An operation of the dispensing probe 30 will be described in detail with reference to FIGS. 6A and 6B. P1, P2, and P3 in FIGS. 6A and 6B indicate points of an elapsed time. Similarly, P* (* is a numeral for calculation) displayed in the drawings to be described later indicates a point of an elapsed time, and description thereof will be omitted. In FIGS. 6A and 6B, a discharge operation is started at the point P1, a lifting operation of the dispensing probe 30 is started at the point P2, and the discharge operation and the lifting operation are ended at the point P3.

At the point P1 of the elapsed time, the analysis control unit 8 controls the dispensing probe 30 to start a discharge operation. First, the specimen 33 is discharged from the tip end of the dispensing probe 30 into the reaction vessel 14. At the time point P1, the dispensing probe 30 is stopped at a height of several millimeters above the bottom of the reaction vessel 14, and the lifting operation of the dispensing probe 30 is not yet started. Up to the point P2 when the lifting operation of the dispensing probe 30 is started, that is, from P1 to P2, a liquid level of a discharged liquid rises, and thus the distance Da between the tip end of the dispensing probe 30 and the liquid level decreases with an elapsed time.

Subsequently, the analysis control unit 8 controls the dispensing probe 30 to start the lifting operation at the point P2 of the elapsed time. A discharged liquid (the specimen 33 or the reagent 32) is continuously discharged from the tip end of the dispensing probe 30. The liquid discharged from the tip end of the dispensing probe 30 at the time point P2 may be either the specimen 33 or the reagent 32. That is, the analysis control unit 8 may bring the dispensing probe 30 into standby (does not start the lifting operation) until all specimens 33 are discharged, and then control the dispensing probe 30 to start the lifting operation after starting discharging of the reagent 32 from the tip end of the dispensing probe 30. The analysis control unit 8 may control the dispensing probe 30 to start the lifting operation at the same time as the start of discharging the specimen 33 (at the point P1 of the elapsed time) or may control the dispensing probe 30 to start the lifting operation during discharging the specimen 33.

After the point P2 of the elapsed time, the analysis control unit 8 controls the dispensing probe 30 to perform the discharge operation and the lifting operation until discharging of a liquid at a specified amount is completed (until P3). In addition, the analysis control unit 8 controls a lifting speed of the dispensing probe 30 so that the distance Da between the tip end of the dispensing probe 30 and the liquid level of the reaction liquid 36 in the reaction vessel 14 increases with an elapsed time until discharging of a liquid at a specified amount is completed (until P3). That is, the analysis control unit 8 controls the lifting speed of the dispensing probe 30 so that the above-described change rate a of the distance Da between the tip end of the dispensing probe 30 and the height of the liquid level of the reaction liquid 36 (for example, $\alpha$=8.0 m/s) is achieved. The analysis control unit 8 ends the discharge operation and the lifting operation of the dispensing probe at the point P3 of the elapsed time when the specimen 33 and the reagent 32 are discharged at a specified amount.

In this manner, a height position 35 (see FIG. 5) at which the discharged liquid arrives in the reaction liquid 36 also gradually changes by increasing the distance Da between the tip end of the dispensing probe 30 and the height of the liquid level of the reaction liquid 36 with an elapsed time. As a result, a liquid flow can be given to the entire reaction liquid 36, and an effect of efficiently stirring the discharged specimen 33 and reagent 32 by the discharge operation is obtained.

In the above description, a position at which the dispensing probe 30 is lowered into the reaction vessel 14 before the start of discharging is preferably in the vicinity of the bottom of the reaction vessel 14, that is, about several millimeters from the bottom of the reaction vessel 14. When the discharge operation is started, it is assumed that the segmented air 37 between the specimen 33 and the reagent 32 disappears when the segmented air is discharged from the tip end of the probe, and one or both of the specimen 33 and the reagent 32 scatter onto a wall surface of the reaction vessel 14. When the scattered liquid remains adhering to the wall surface of the reaction vessel 14, reaction of the reaction liquid does not proceed sufficiently, which may adversely affect an analysis result. In recent years, a technique for reducing an amount of a specimen used in a measurement has been advanced due to the trend of reducing burdens on a patient. It is assumed that the number of specimens used in a measurement is as small as about 40 µL. Therefore, discharging is started when a position of the tip end of the dispensing probe 30 at the start of discharging is in the vicinity of the bottom of the reaction vessel 14 (in the last embodiment, the position of the tip end of the dispensing probe 30 is set to 1 to 2 mm from the bottom of the reaction vessel 14), and the segmented air 37 between the specimen 33 and the reagent 32 is discharged in the vicinity of the bottom of the reaction vessel 14. Accordingly, even when scattering of the discharged liquid occurs due to the segmented air 37 between the specimen 33 and the reagent 32, since the reagent continues to be discharged from a higher position thereafter, the scattered liquid adhering to the reaction vessel 14 is buried in the reaction liquid 36 as the liquid level rises. In this manner, the analysis control unit 8 controls the dispensing probe 30 to be lowered to the vicinity of the bottom of the reaction vessel 14 and controls the start of the discharge operation, so that an influence of scattering can be reduced, and an effect of improving analysis performance is obtained.

First Embodiment: Summary

When the specimen 33 and the reagent 32 that are different liquids are simultaneously discharged, the automatic analyzer 10 according to the first embodiment can gradually change an arrival position of a height of the discharged liquid in the reaction liquid 36 by increasing the distance Da between the tip end of the dispensing probe 30 and the liquid level of the reaction liquid 36 with an elapsed time. As a result, a large liquid flow can be given to the entire reaction liquid, and the specimen 33 and the reagent 32 can be efficiently stirred at the time of discharging. When stirring can be efficiently performed at the time of discharging, a time required for a subsequent additional stirring operation (pipette stirring or the like) can be shortened, and processing capacity is improved. When stirring can be sufficiently performed at the time of discharging, an additional stirring mechanism (stirring using ultrasonic waves or the like) is not necessary, which leads to space saving of a device.

In the automatic analyzer 10 according to the first embodiment, the dispensing probe 30 is lowered to the vicinity of a bottom portion of the reaction vessel 14 to start discharging, so that a position to which a scattered liquid adheres due to the segmented air 38 between the specimen 33 and the reagent 32 can be restricted to the vicinity of the bottom portion of the reaction vessel 14. The lifting operation of the probe is started at the same time as or several milliseconds after the start of discharging, so that the reagent 32 is discharged from a high position while the dispensing probe 30 is raised, and thus the scattered liquid adhering to the reaction vessel 14 is buried in the reaction liquid 36 due to the rise of the liquid level of the reaction liquid 36. As a result, an influence of scattering on measurement data can be reduced, and analysis performance can be improved.

Although not particularly illustrated, the automatic analyzer 10 according to the first embodiment may have a configuration of an automatic analyzer and a dispensing flow as will be described below. The dispensing probe 30 aspirates the specimen 33 from the specimen vessel 24 and discharges the specimen 33 to the reaction vessel 14. Subsequently, the tip end of the dispensing probe 30 is washed by the dispensing mechanism washing unit 26, and then the dispensing probe 30 aspirates the reagent 32 from the reagent vessel 22. Then, after the tip end of the dispensing probe 30 is washed by the dispensing mechanism washing unit 26, the analysis control unit 8 lowers the dispensing probe 30 to the vicinity of a height of a liquid level (for example, 1 mm above the liquid level) of the specimen 33 in the reaction vessel 14. Thereafter, the analysis control unit 8 controls the dispensing probe 30 to start the lifting operation at the same time as the start of the discharge operation of the reagent 32 or after several milliseconds. Subsequently, the analysis control unit 8 controls the dispensing probe 30 to perform the lifting operation and the discharge operation until the reagent 32 is discharged at a specified amount. In addition, the analysis control unit 8 controls the lifting speed of the dispensing probe 30 so that the distance Da between the tip end of the dispensing probe 30 and the liquid level of the reaction liquid 36 in the reaction vessel 14 increases with an elapsed time. As a result, an arrival position of a height of a discharged liquid in the reaction liquid 36 can be gradually changed. A large liquid flow can be given to the entire reaction liquid, and the specimen 33 and the reagent 32 can be efficiently stirred at the time of discharging.

Although not particularly illustrated, the automatic analyzer 10 according to the first embodiment may have a configuration of an automatic analyzer and a dispensing flow as will be described below. The automatic analyzer 10 includes two dispensing probes 30. That is, the automatic analyzer 10 includes a specimen probe that dispenses the specimen 33 and a reagent probe that dispenses the reagent 32. The specimen probe aspirates the specimen 33 from the specimen vessel 24. The reagent probe aspirates the reagent 32 from the reagent vessel 22. After tip ends of the two probes are washed by the dispensing mechanism washing unit 26, the analysis control unit 8 lowers the specimen probe and the reagent probe to the vicinity of the bottom of the reaction vessel 14, and starts to discharge the specimen 33 from the specimen probe and discharge the reagent 32 from the reagent probe. The analysis control unit 8 controls the dispensing probe 30 to start the lifting operation at the same time as the start of discharging or after several milliseconds. Subsequently, the analysis control unit 8 controls the dispensing probe 30 to perform the lifting operation and the discharge operation until the reagent 32 is discharged at a specified amount. In addition, the analysis control unit 8 controls the lifting speed of the dispensing probe 30 so that the distance Da between the tip end of the dispensing probe 30 and the liquid level of the reaction liquid 36 in the reaction vessel 14 increases with an elapsed time. As a result, an arrival position of a height of a discharged liquid in the reaction liquid 36 can be gradually changed. A large liquid flow can be given to the entire reaction liquid, and the specimen 33 and the reagent 32 can be efficiently stirred at the time of discharging.

Further, although not particularly illustrated, the automatic analyzer 10 according to the first embodiment may have a configuration of an automatic analyzer and a dispensing flow as will be described below. The second reagent may be discharged into the reaction vessel 14 in step S06. The analysis control unit 8 lowers the dispensing probe 30 to the vicinity of a height of a liquid level (for example, 1 mm above the liquid level) of a reaction liquid (a mixed liquid of the specimen 33 and the reagent 32) in the reaction vessel 14. Thereafter, the analysis control unit 8 controls the dispensing probe 30 to start the lifting operation at the same time as the start of the discharge operation of the second reagent or after several milliseconds. Subsequently, the analysis control unit 8 controls the dispensing probe 30 to perform the lifting operation and the discharge operation until the second reagent is discharged at a specified amount. In addition, the analysis control unit 8 controls the lifting speed of the dispensing probe 30 so that the distance Da between the tip end of the dispensing probe 30 and the liquid level of the reaction liquid 36 in the reaction vessel 14 increases with an elapsed time. As a result, an arrival position of a height of a discharged liquid in the reaction liquid 36 can be gradually changed. A large liquid flow can be given to the entire reaction liquid, and the reaction liquid (the mixed liquid of the specimen 33 and the reagent 32) and the second reagent can be efficiently stirred at the time of discharging.

Second Embodiment

In the first embodiment, the analysis control unit 8 controls the lifting speed of the dispensing probe 30 so that the distance Da between the tip end of the dispensing probe 30 and the liquid level of the reaction liquid 36 in the reaction vessel 14 increases with an elapsed time until discharging of the reagent of a specified amount is completed in step S03. A procedure for lifting the dispensing probe 30 is not limited thereto.

In the second embodiment, after the analysis control unit 8 performs control for a predetermined time so that the distance Da increases with an elapsed time, the analysis control unit 8 performs control so that the distance Da decreases with an elapsed time. In this case, the same effects as those of the first embodiment can also be obtained. Since the configuration of the automatic analyzer 10 is the same as that in the first embodiment, differences in the dispensing operation will be mainly described below.

FIG. 7 is a diagram schematically illustrating a movement of the dispensing probe 30 and its effect when the automatic analyzer 10 simultaneously dispenses the specimen and the first reagent in the second embodiment. A time change of a position of the tip end of the dispensing probe 30 in FIG. 7 will be described with reference to FIGS. 8A and 8B.

Figure 8A:
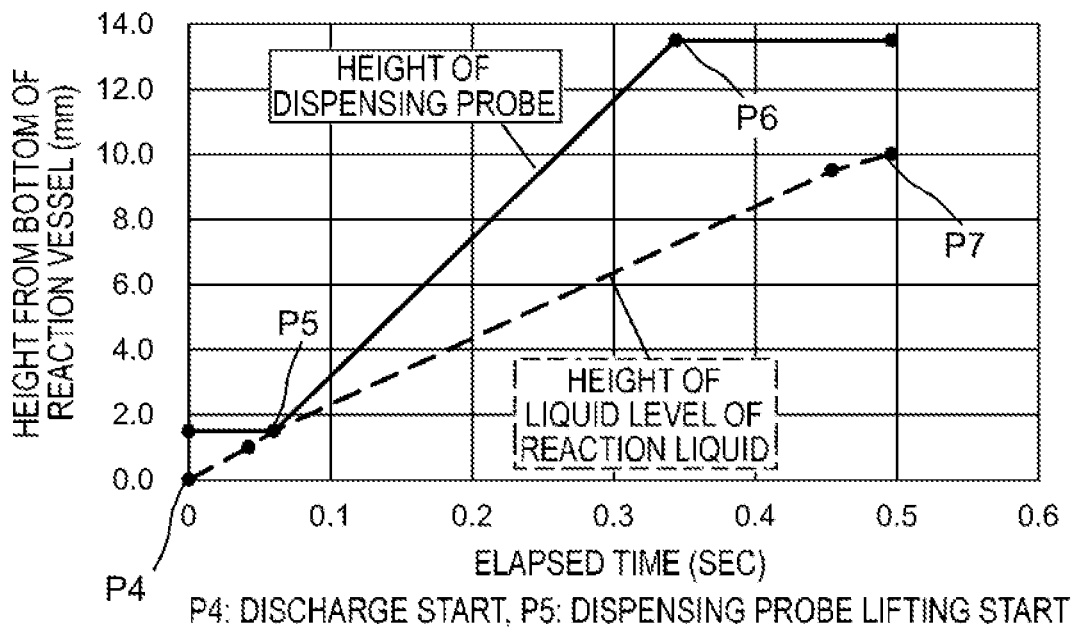
FIG. 8A is a relationship diagram between the height of the tip end of the dispensing probe 30 from the bottom of the reaction vessel 14 and the height of the liquid level of the reaction liquid 36.
Figure 8B:
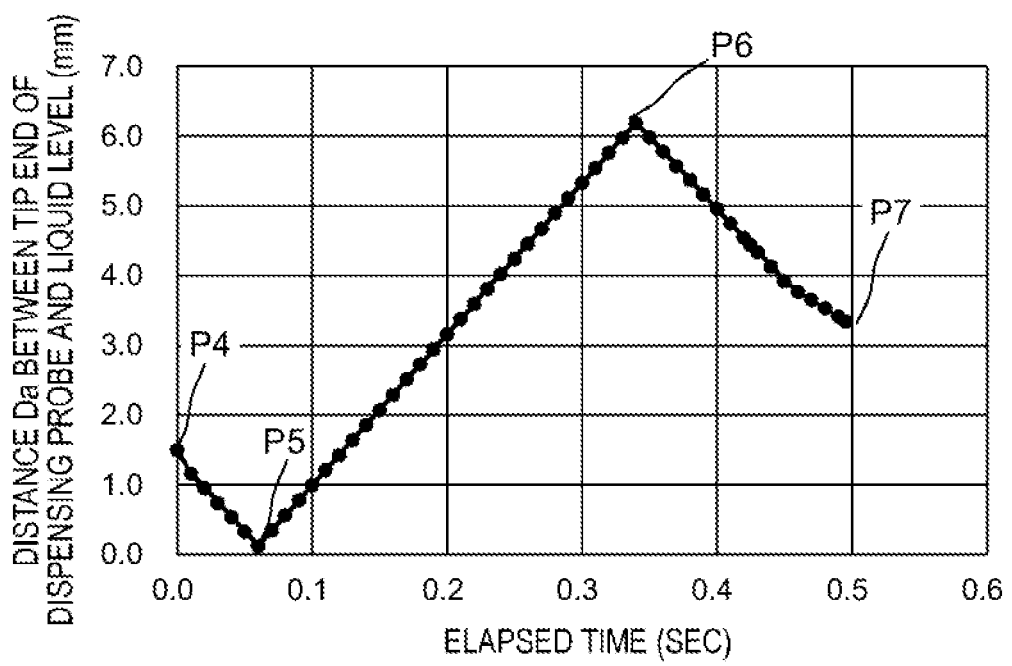
FIG. 8B is a diagram illustrating an elapsed time change in a distance Da between the tip end of the dispensing probe 30 and the liquid level of the reaction liquid 36.

FIG. 8A Illustrates a relationship between the height of the tip end of the dispensing probe 30 from the bottom of the reaction vessel 14 and the height of the liquid level of the reaction liquid 36. FIG. 8B illustrates an elapsed time change in the distance Da between the tip end of the dispensing probe 30 and the liquid level of the reaction liquid 36. The second embodiment will be described in detail with reference to FIGS. 8A and 8B. Lifting control of the dispensing probe 30 performed by the analysis control unit 8 is the same as that in the first embodiment, and thus description thereof will be omitted.

The analysis control unit 8 controls the dispensing probe 30 to start the discharge operation (P4), and lifts the probe of the dispensing probe 30 so that the distance Da increases with an elapsed time (P5 to P6). After a certain period of time is elapsed, the analysis control unit 8 stops the lifting operation of the dispensing probe 30 at the P6 of the elapsed time at a time point before discharging of the reagent of a specified amount is completed). At the time point P6, the discharge operation is continued. The analysis control unit 8 ends the discharge operation at a point P7 of the elapsed time when the reagent is discharged at a specified amount. That is, the analysis control unit 8 performs control to increase the distance Da from the point P5 of the elapsed time to the point P6 of the elapsed time, and performs control to decrease the distance Da from the point P6 to the point P7 of the elapsed time.

Second Embodiment: Summary

The automatic analyzer 10 according to the second embodiment moves the dispensing probe 30 so as to increase the distance Da, and then moves the dispensing probe 30 so as to decrease the distance Da by fixing a position of the dispensing probe 30 in the vertical direction. The second embodiment can obtain the same effects as those of the first embodiment.

Third Embodiment

In step S03, the analysis control unit 8 may perform control to immerse the tip end of the dispensing probe 30 into the liquid level of the reaction liquid 36 when discharging of the reagent of a specified amount is completed (when discharging of the reagent 32 is completed). In a third embodiment, a specific example will be described. In this case, the same effects as those of the first embodiment can also be obtained. Since the configuration of the automatic analyzer 10 is the same as that in the first embodiment, differences in a dispensing operation will be mainly described below.

FIG. 9 is a diagram schematically illustrating a movement of the dispensing probe 30 and its effect when the automatic analyzer 10 simultaneously dispenses the specimen and the first reagent in the third embodiment. A time change of a position of the tip end of the dispensing probe 30 in FIG. 9 will be described with reference to FIGS. 10A and 10B.

Figure 10A:
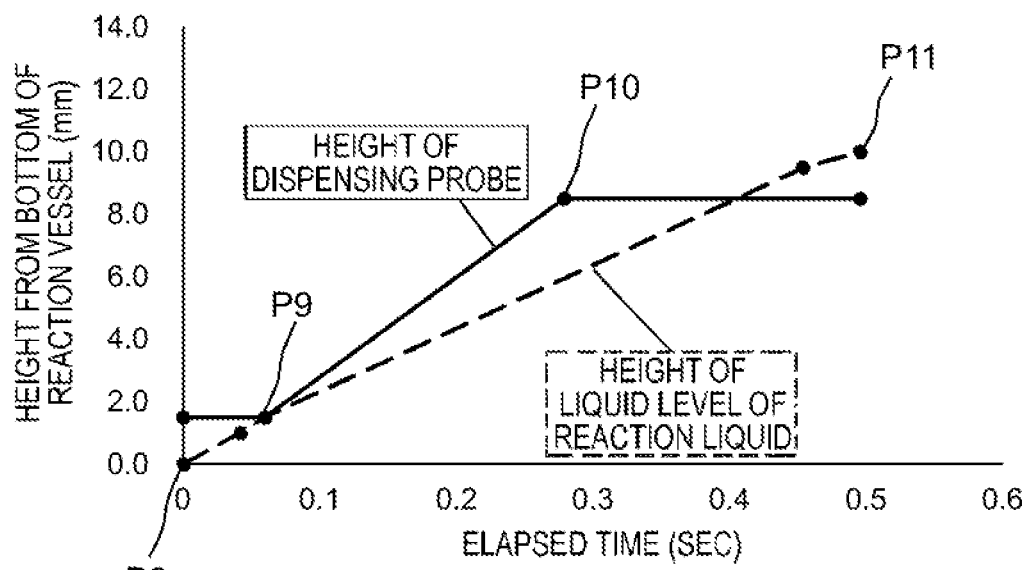
FIG. 10A is a relationship diagram between the height of the tip end of the dispensing probe 30 from the bottom of the reaction vessel 14 and the height of the liquid level of the reaction liquid 36.
Figure 10B:
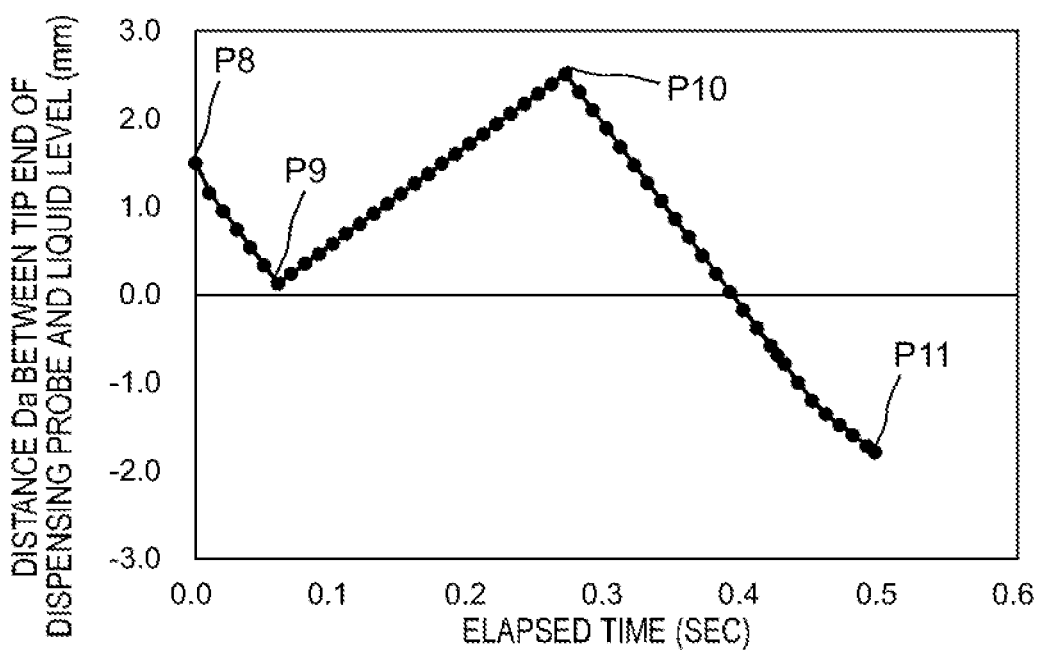
FIG. 10B is a diagram illustrating an elapsed time change in a distance Da between the tip end of the dispensing probe 30 and the liquid level of the reaction liquid 36.

FIG. 10A illustrates a relationship between the height of the tip end of the dispensing probe 30 from the bottom of the reaction vessel 14 and the height of the liquid level of the reaction liquid 36. FIG. 10B illustrates an elapsed time change in the distance Da between the tip end of the dispensing probe 30 and the liquid level of the reaction liquid 36. The third embodiment will be described in detail with reference to FIGS. 10A and 10B. Lifting control of the dispensing probe 30 performed by the analysis control unit 8 is the same as that in the first embodiment, and thus description thereof will be omitted.

The analysis control unit 8 controls the dispensing probe 30 to start the discharge operation (P8), and controls a probe lining operation of the dispensing probe 30 so that the distance Da increases with an elapsed time (P9 to P10). After a certain period of time is elapsed, the analysis control unit 8 stops the lifting operation of the dispensing probe 30 at the point PICT of the elapsed time (at a time point before discharging of the reagent of a specified amount is completed). At this time, the analysis control unit 8 stops the lifting operation of the dispensing probe 30 so that a stopping position of the dispensing probe 30 is located at a position lower than the height of the liquid level of the reaction liquid 36 after the reagent is discharged at a specified amount. Thereafter, the discharge operation is ended at a point P11 of the elapsed time. That is, at the point P11 of the elapsed time when discharging of the reagent of a specified amount is completed, the tip end of the dispensing probe 30 is in a state of being immersed in the reaction liquid 36. It is preferable that an immersing amount of the tip end of the dispensing probe 30 is about several millimeters (for example, 4 mm) in order to reduce a contamination range of the tip end of the dispensing probe.

The liquid level detector 48 may detect the liquid level at the point P11 of the elapsed time. Due to a difference in wettability of the reaction liquid 36 (due to an influence of meniscus), it is expected that the height of the liquid level of the reaction liquid 36 is slightly different from known data. Therefore, the liquid level may be detected using the liquid level detector 48 after the discharge operation of the dispensing probe 30 is completed, and it may be confirmed whether the tip end of the dispensing probe 30 is accurately immersed in the reaction liquid 36 after discharging is completed.

Third Embodiment: Summary

In the automatic analyzer 10 according to the third embodiment, the analysis control unit 8 controls the tip end of the dispensing probe 30 to be immersed in the reaction liquid 36 when discharging of the reagent is completed. For example, under a condition that the liquid discharging at the tip end of the dispensing probe 30 at the end of discharging is poor and liquid droplets are formed at the tip end of the dispensing probe 30, the liquid droplets may not be discharged into the reaction vessel 14, and the reagent may not be accurately dispensed at a specified amount. When the tip end of the dispensing probe 30 is immersed in the liquid level at the end of discharging, the liquid droplets can be immersed in the reaction liquid, and the reagent can be accurately dispensed at a specified amount. As a result, analysis performance is improved.

The automatic analyzer 10 according to the third embodiment can accurately determine whether the tip end of the dispensing probe 30 is immersed in the liquid level of the reaction liquid 36 by the liquid level detector 48 detecting the liquid level at the end of discharging. When the liquid level detector 48 does not detect the liquid level, since dispensing performance deteriorates due to the formation of the liquid droplets at the tip end of the dispensing probe 30, the analysis control unit 8 may add a data alarm indicating that the liquid level cannot be detected on the display device 5 via the interface 9. As a result, a user can know a cause of data failure, and can appropriately deal with the data failure, for example, by requesting a re-inspection. Appropriate measurement data can be obtained by performing a re-inspection, which leads to an improvement in reliability of a measurement result.

Fourth Embodiment

In step S03, the analysis control unit 8 may perform control to stop the tip end of the dispensing probe 30 above the liquid level of the reaction liquid 36 when discharging of the reagent of a specified amount is completed (when discharging of the reagent 32 is completed). In a fourth embodiment, a specific example will be described. In this case, the same effects as those of the first embodiment can also be obtained. Since the configuration of the automatic analyzer 10 is the same as that in the first embodiment, differences in a dispensing operation will be mainly described below.

Figure 11:
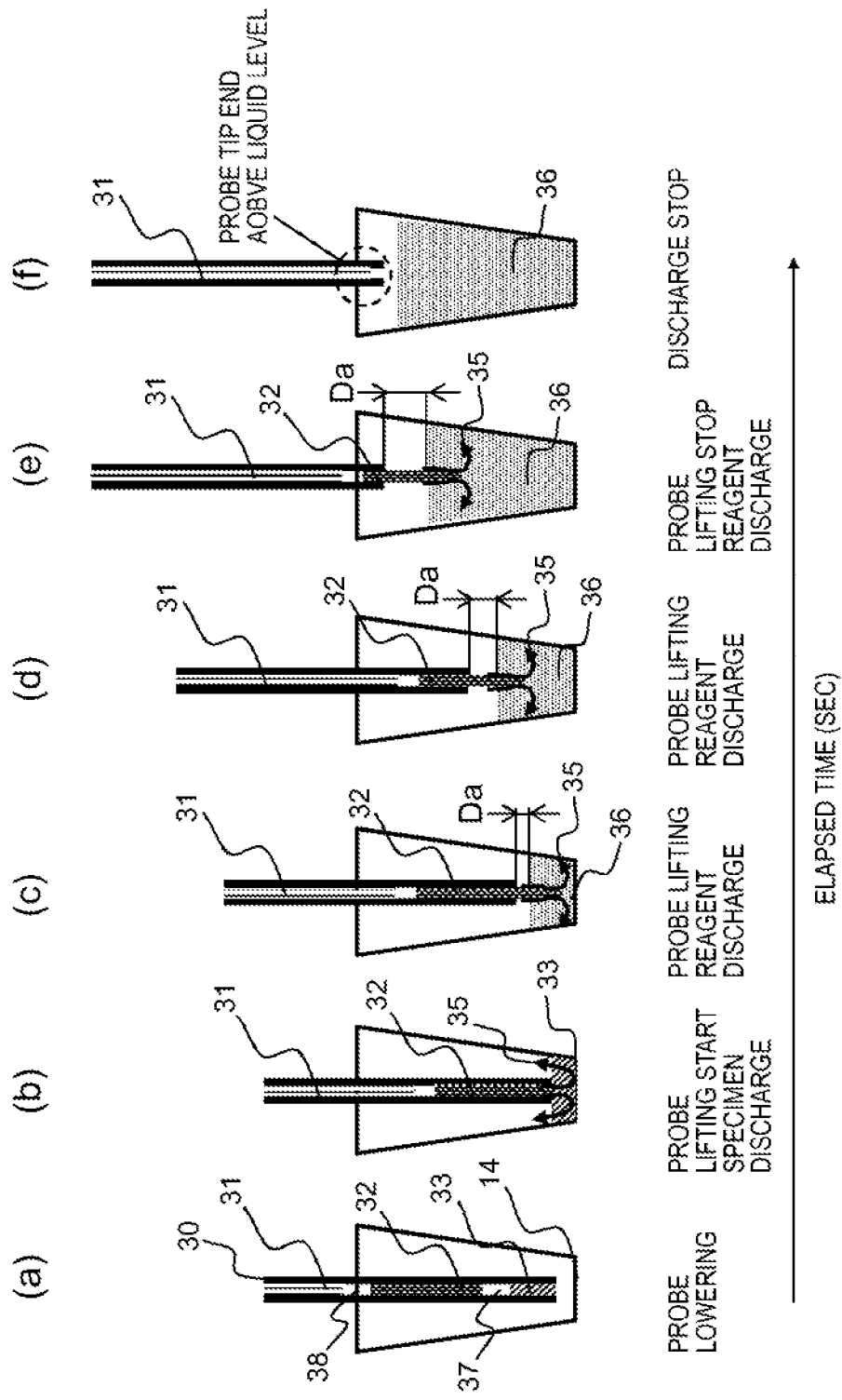
FIG. 11 is a diagram schematically illustrating a movement of the dispensing probe 30 and an effect thereof when the automatic analyzer 10 simultaneously dispenses a specimen and a first reagent in a fourth embodiment.

FIG. 11 is a diagram schematically illustrating a movement of the dispensing probe 30 and its effect when the automatic analyzer 10 simultaneously dispenses the specimen and the first reagent in the fourth embodiment. A time change of a position of the tip end of the dispensing probe 30 in FIG. 11 will be described with reference to FIGS. 12A and 12B.

Figure 12A:
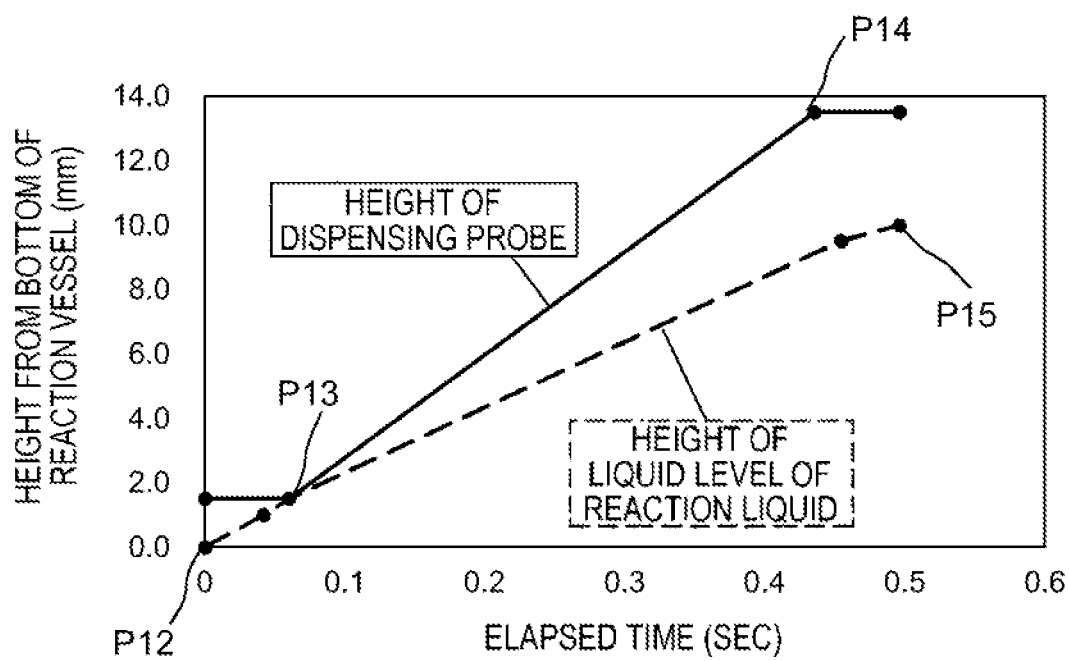
FIG. 12A is a relationship diagram between the height of the tip end of the dispensing probe 30 from the bottom of the reaction vessel 14 and the height of the liquid level of the reaction liquid 36.
Figure 12B:
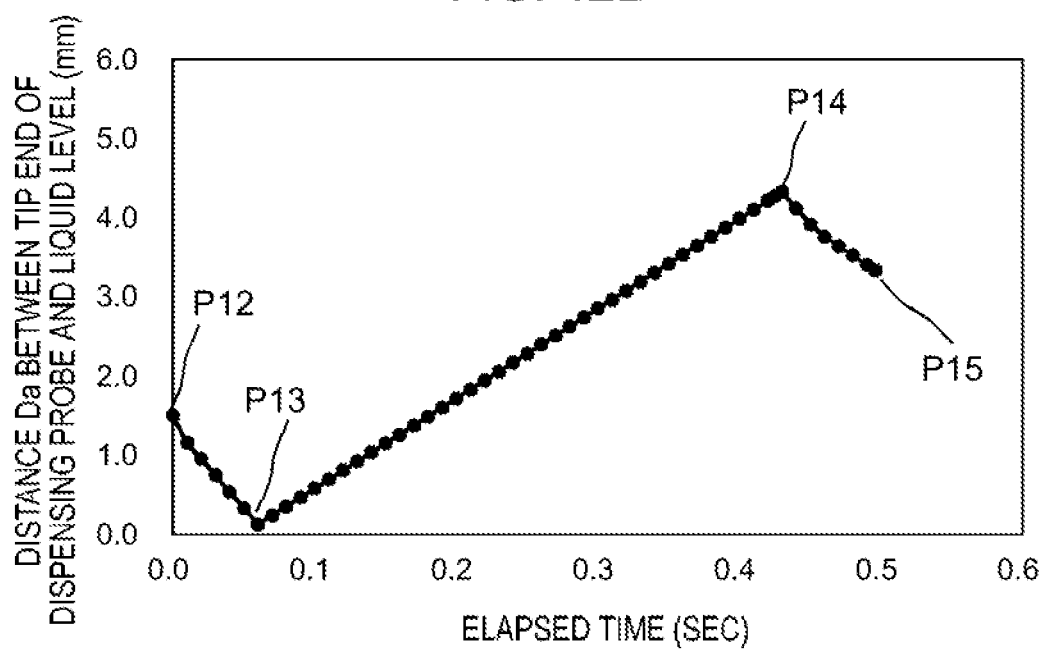
FIG. 12B is a diagram illustrating an elapsed time change in a distance Da between the tip end of the dispensing probe 30 and the liquid level of the reaction liquid 36.

FIG. 12A illustrates a relationship between the height of the tip end of the dispensing probe 30 from the bottom of the reaction vessel 14 and the height of the liquid level of the reaction liquid 36. FIG. 12B illustrates an elapsed time change in the distance Da between the tip end of the dispensing probe 30 and the liquid level of the reaction liquid 36. The fourth embodiment will be described in detail with reference to FIGS. 12A and 12B. Lifting control of the dispensing probe 30 performed by the analysis control unit 8 is the same as that in the first embodiment, and thus description thereof will be omitted.

The analysis control unit 8 controls the dispensing probe 30 to start the discharge operation (P12), and controls the probe lifting operation of the dispensing probe 30 so that the distance Da increases with an elapsed time (P13 to P14). After a certain period of time is elapsed, the analysis control unit 8 stops the lifting operation of the dispensing probe 30 at the point P14 of the elapsed time (at a time point before discharging of the reagent of a specified amount is completed). At this time, the analysis control unit 8 stops the lifting operation of the dispensing probe 30 so that the stopping position of the dispensing probe 30 is located at a position higher than the liquid level of the reaction liquid 36 alter the reagent is discharged at a specified amount. Thereafter, the discharge operation is ended at a point P15 of the elapsed time. That is, at the point P15 of the elapsed time when discharging of the reagent of a specified amount is completed, the tip end of the dispensing probe 30 is located at a position higher than the liquid level of the reaction liquid 36.

Fourth Embodiment: Summary

In the automatic analyzer 10 according to the fourth embodiment, the analysis control unit 8 controls the tip end of the dispensing probe 30 to be higher than the liquid level of the reaction liquid 36 at the end of discharging. For example, in step S04 in FIG. 4, when pipette stirring (stirring by aspirating and discharging the reaction liquid 36 again alter discharging) is performed, a state in the dispensing probe 30 before the start of the pipette stirring is a state in which the dispensing probe 30 is filled with a liquid (system water or the like). In order to prevent the reaction liquid 36 to be aspirated again in the dispensing probe 30 and the liquid (such as the system water 31) in the tip end of the dispensing probe 30 from being mixed by the pipette stirring, it is necessary to aspirate air before aspirating the reaction liquid 36 again. That is, it is necessary to form a layer of segmented air between the reaction liquid 36 and the system water 31. When the specimen and the reagent discharge operation of the dispensing probe 30 is completed in a state in which the tip end of the dispensing probe 30 is immersed in the reaction liquid 36, it is necessary to add a lifting operation of pulling out the tip end of the dispensing probe 30 from the reaction liquid 36 in order to form the layer of segmented air. On the other hand, as in the fourth embodiment, when the tip end of the dispensing probe 30 is stopped above the liquid level of the reaction liquid 36 at the end of discharging, the tip end of the dispensing probe 30 is in the air, so that air can be aspirated without the necessary to add the lifting operation. As a result, an operation time from the start of discharging by the dispensing probe 30 to the end of stirring (pipette stirring) is reduced, and the effect of improving processing capacity of the automatic analyzer 10 is obtained.

Fifth Embodiment

In step S03, the analysis control unit 8 may perform control such that the tip end of the dispensing probe 30 is immersed in the discharged specimen 33 or the liquid level of the reaction liquid 36 for a certain period of time after the start or the end of discharging of the specimen 33. In a fifth embodiment, a specific example will be described. In this case, the same effects as those of the first embodiment can also be obtained. Since the configuration of the automatic analyzer 10 is the same as that in the first embodiment, differences in a dispensing operation will be mainly described below.

Figure 13:
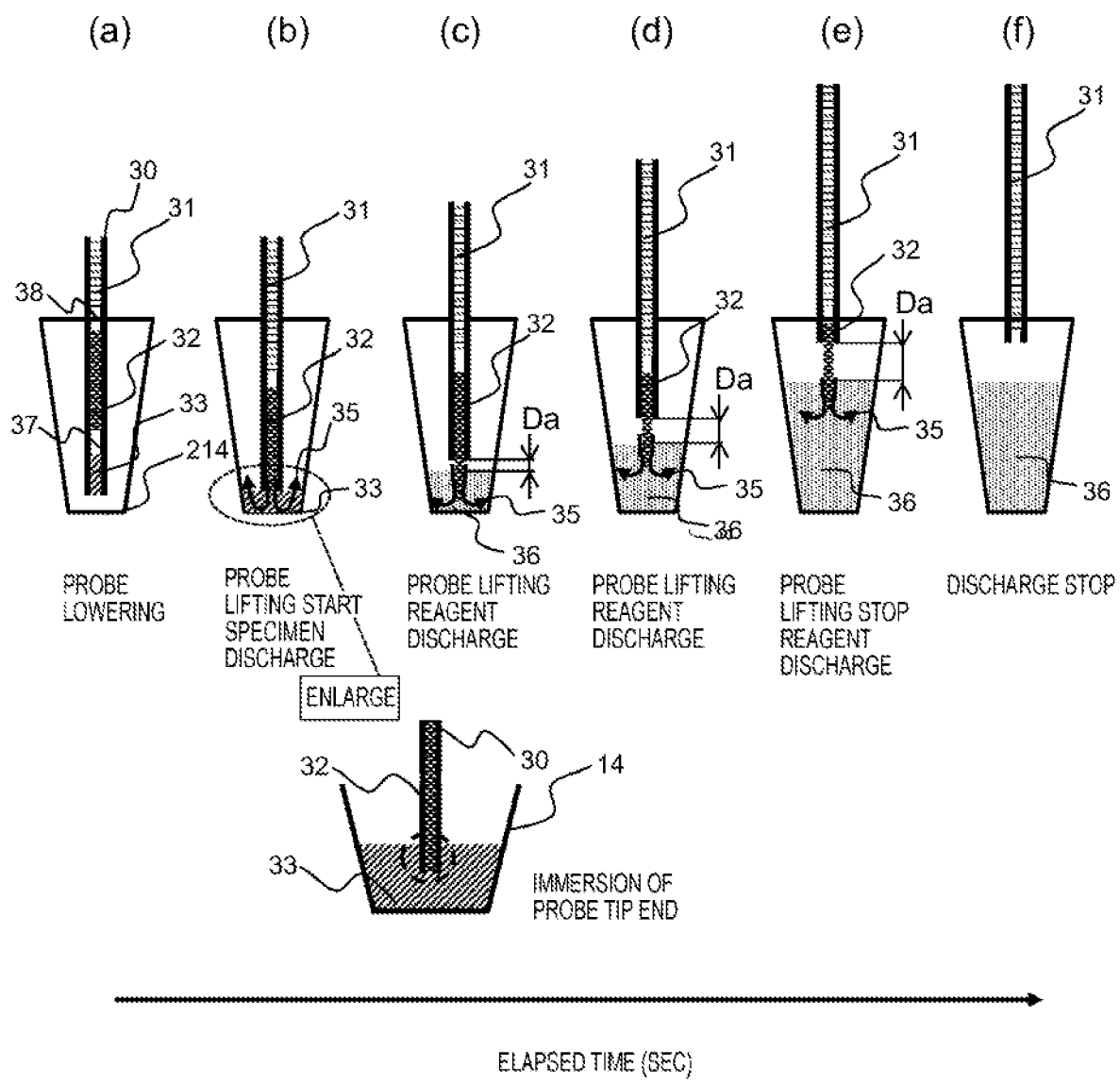
FIG. 13 is a diagram schematically illustrating a movement of the dispensing probe 30 and an effect thereof when the automatic analyzer 10 simultaneously dispenses a specimen and a first reagent in a fifth embodiment.

FIG. 13 is a diagram schematically illustrating a movement of the dispensing probe 30 and its effect when the automatic analyzer 10 simultaneously dispenses the specimen and the first reagent in the fifth embodiment. A time change of a position of the tip end of the dispensing probe 30 in FIG. 13 will be described with reference to FIGS. 14A and 14B.

Figure 14A:
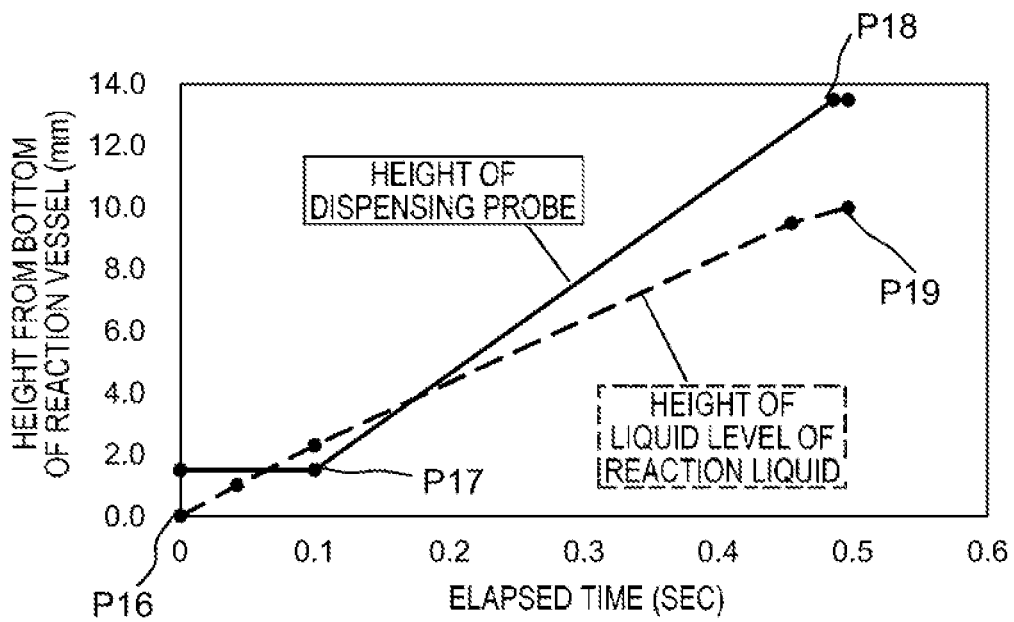
FIG. 14A is a relationship diagram between the height of the tip end of the dispensing probe 30 from the bottom of the reaction vessel 14 and the height of the liquid level of the reaction liquid 36.
Figure 14B:
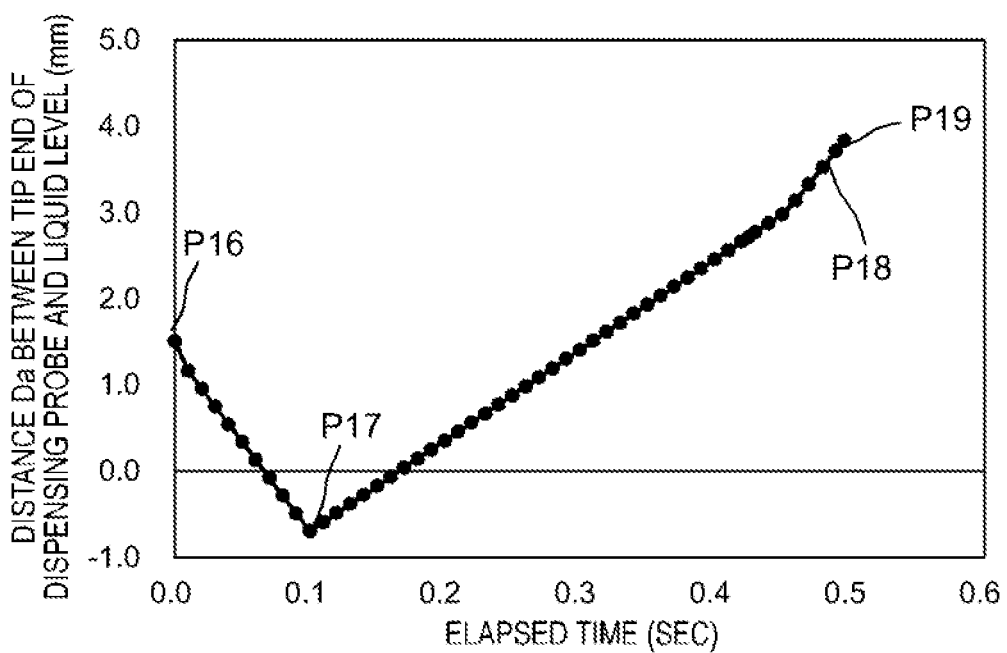
FIG. 14B is a diagram illustrating an elapsed time change in a distance Da between the tip end of the dispensing probe 30 and the liquid level of the reaction liquid 36.

FIG. 14A illustrates a relationship between the height of the tip end of the dispensing probe 30 from the bottom of the reaction vessel 14 and the height of the liquid level of the reaction liquid 36. FIG. 14B illustrates an elapsed time change in the distance Da between the tip end of the dispensing probe 30 and the liquid level of the reaction liquid 36. The fifth embodiment will be described in detail with reference to FIGS. 14A and 14B. Lifting control of the dispensing probe 30 performed by the analysis control unit 8 is the same as that in the first embodiment, and thus description thereof will be omitted.

The analysis control unit 8 controls the dispensing probe 30 to start the discharge operation (P16). The analysis control unit 8 may perform control such that the tip end of the dispensing probe 30 is immersed in the discharged specimen 33 or the reaction liquid 36 (a mixed liquid of the specimen 33 and the reagent 32) for a certain period of time after discharging of the specimen 33 is completed. That is, the analysis control unit 8 controls a lowering amount of the dispensing probe 30 to the reaction vessel 14 before the start of the discharge so as to immerse the tip end of the dispensing probe 30 in the discharged specimen 33 and the reaction liquid 36 (the specimen 33 and the reagent 32) for a certain period of time after discharging of the specimen 33 is completed, and after the tip end of the dispensing probe 30 is immersed, the analysis control unit 8 performs control to lift the dispensing probe 30 while discharging the reagent 32. Alternatively, the analysis control unit 8 may perform control such that the tip end of the dispensing probe 30 is in standby at a discharge start position until the tip end of the dispensing probe 30 is immersed in the discharged specimen 33 or the reaction liquid 36 (the specimen 33 and the reagent 32) for a certain period of time after discharging of the specimen 33 is completed, and thereafter perform control to lift the dispensing probe 30 while discharging the reagent 32.

It is preferable that the immersing amount of the tip end of the dispensing probe 30 is about several millimeters in order to reduce a contamination range of a nozzle tip end. For example, it is preferable that the analysis control unit 8 controls the dispensing probe 30 such that the immersing amount of the tip end of the dispensing probe 30 is about 4 mm or less.

Fifth Embodiment: Summary

In the automatic analyzer 10 according to the fifth embodiment, the tip end of the dispensing probe 30 is immersed in the specimen 33 or the liquid level of the reaction liquid 36 (the specimen 33 and the reagent 32) in the vessel for a certain period of time after the start or after the end of discharging the specimen 33. Accordingly; for example, when the tip end of the probe is immersed in a liquid when all specimens are discharged, the segmented air 37 that is present between the specimen 33 and the reagent 32 and is subsequently discharged from the tip end of the dispensing probe 30 is discharged into the specimen 33 or into the reaction liquid 36 of the specimen 33 and the reagent 32. In this case, since the tip end of the dispensing probe 30 is in the liquid, it is possible to prevent an influence of liquid scattering caused by the segmented air 37. That is, analysis performance can be improved.

Sixth Embodiment

In step S03, the analysis control unit 8 may perform control to start to discharge the specimen 33 and the reagent 32 after lowering the tip end of the probe to the vicinity of a height of a liquid level when the dispensing probe 30 discharges all the specimens 33 into the reaction vessel 14. In a sixth embodiment, a specific example will be described. In this case, the same effects as those of the first embodiment can also be obtained. Since the configuration of the auto-matic analyzer 10 is the same as that in the first embodiment, differences in a dispensing operation will be mainly described below.

Figure 15:
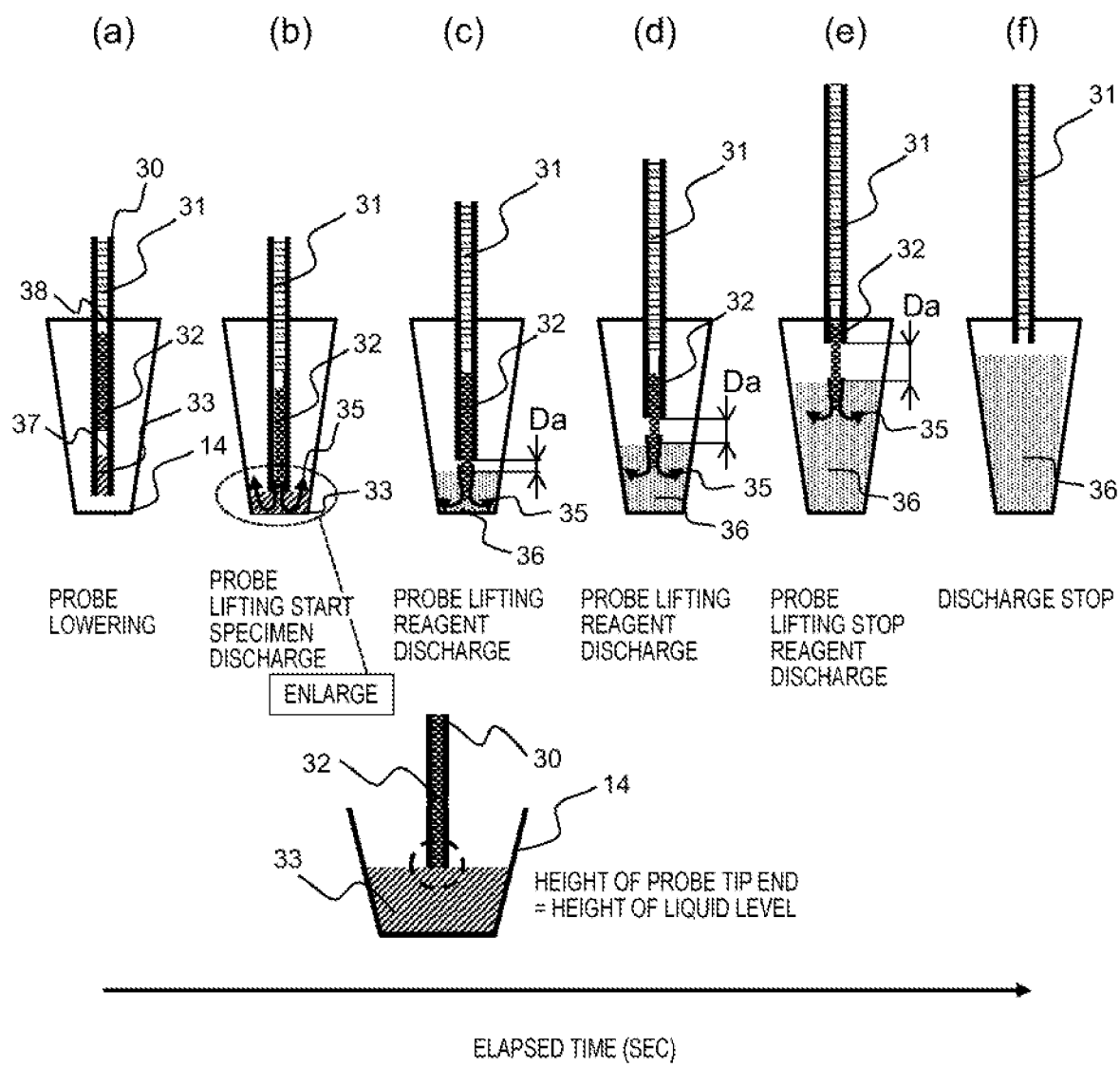
FIG. 15 is a diagram schematically illustrating a movement of the dispensing probe 30 and an effect thereof when the automatic analyzer 10 simultaneously dispenses a specimen and a first reagent in a sixth embodiment.

FIG. 15 is a diagram schematically illustrating a movement of the dispensing probe 30 and its effect when the automatic analyzer 10 simultaneously dispenses the specimen and the first reagent in the sixth embodiment. A time change of a position of the tip end of the dispensing probe 30 in FIG. 15 will be described with reference to FIGS. 16A and 16B.

Figure 16A:
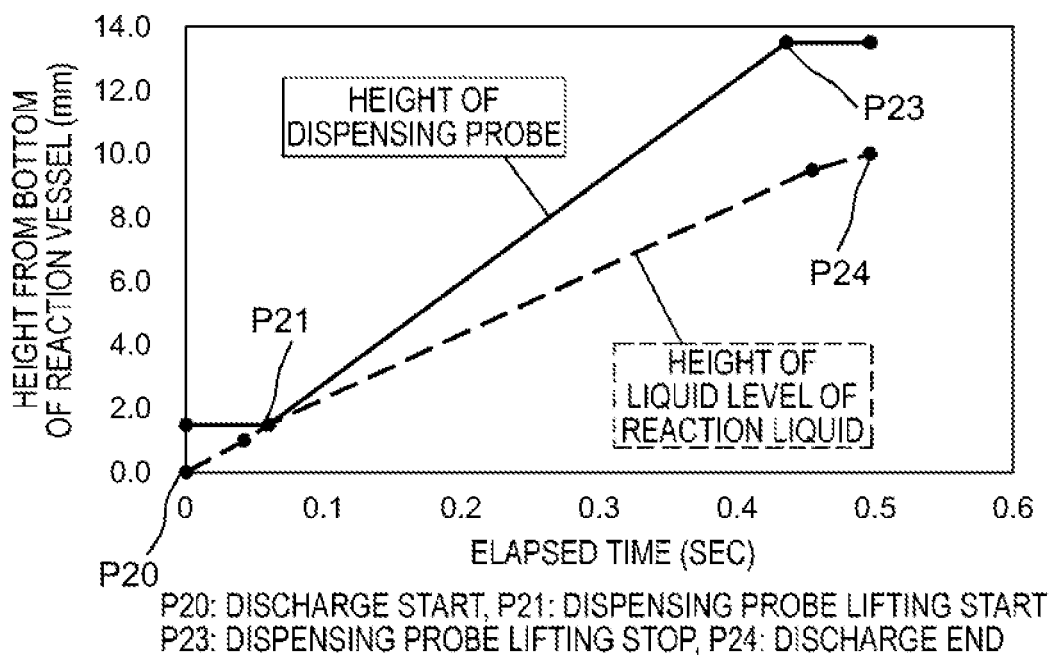
FIG. 16A is a relationship diagram between the height of the tip end of the dispensing probe 30 from the bottom of the reaction vessel 14 and the height of the liquid level of the reaction liquid 36.
Figure 16B:
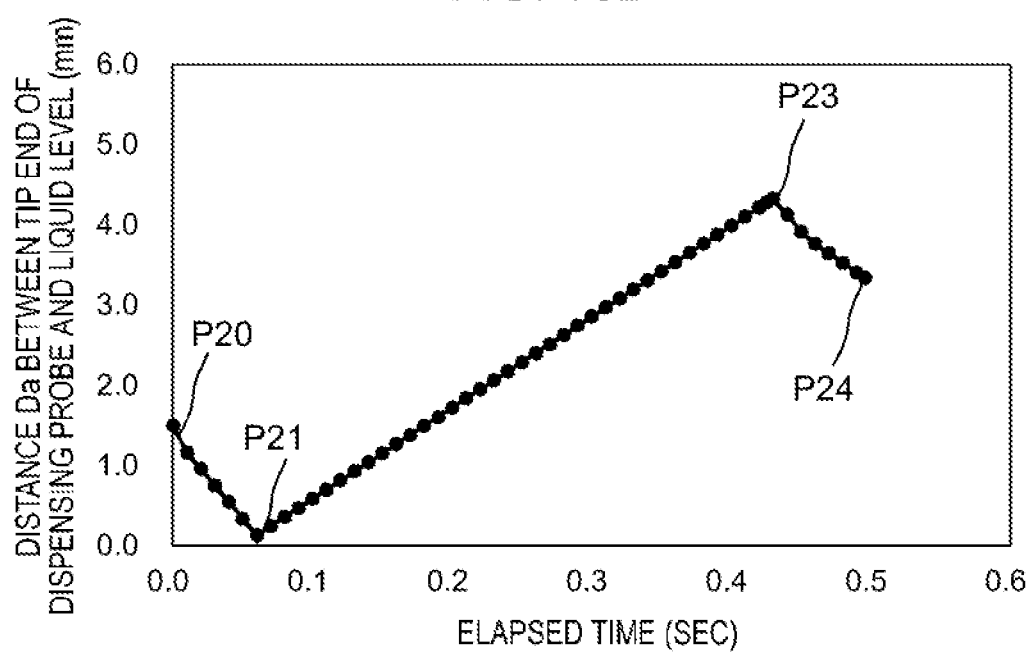
FIG. 16B is a diagram illustrating an elapsed time change in a distance Da between the tip end of the dispensing probe 30 and the liquid level of the reaction liquid 36.

FIG. 16A illustrates a relationship between the height of the tip end of the dispensing probe 30 from the bottom of the reaction vessel 14 and the height of the liquid level of the reaction liquid 36. FIG. 16B illustrates an elapsed time change in the distance Da between the tip end of the dispensing probe 30 and the liquid level of the reaction liquid 36. The sixth embodiment will be described in detail with reference to FIG. 15 and FIGS. 16A and 16B. Lifting control of the dispensing probe 30 performed by the analysis control unit 8 is the same as that in the first embodiment, and thus description thereof will be omitted.

The analysis control unit 8 lowers the dispensing probe 30 into the reaction vessel 14 ((a) in FIG. 15). At this time, the analysis control unit 8 lowers the tip end of the dispensing probe 30 to the vicinity of a height of a liquid level (for example, to the same height as the liquid level or within 1 mm above the liquid level) when the tip end of the dispensing probe 30 discharges all of the specimens 33 at a specified amount. The analysis control unit 8 starts the discharge operation of the dispensing probe 30 (a point P20 of the elapsed time). At a point P21 of the elapsed time, a height of the tip end of the dispensing probe 30 is the same as or several millimeters higher than a height of a liquid level of the discharged specimen 33.

Sixth Embodiment: Summary

In the automatic analyzer 10 according to the sixth embodiment, the dispensing probe 30 is lowered to the vicinity of the height of the liquid level when all of the specimens 33 of a specified amount are discharged into the reaction vessel 14, and then discharging of the specimen 33 is started. As a result, for example, when the height of the tip end of the dispensing probe 30 is the same as the height of the specimen 33 or at a position several millimeters above the specimen 33 when all specimens are discharged, the segmented air 37 that is present between the specimen 33 and the reagent 32 and is subsequently discharged from the tip end of the dispensing probe 30 is discharged in the air. Since the segmented air 37 is discharged in the air, it is possible to prevent air bubbles derived from the segmented air 37 from being mixed into the liquid. When air bubbles are mixed into the reaction liquid and adhere to an optical path region of the light source 12 in the reaction vessel 14, measurement data may be affected. According to the sixth embodiment, analysis performance is improved by preventing the mixing of the air bubbles.

Seventh Embodiment

In step S03, the analysis control unit 8 may change a lifting speed of the dispensing probe 30 in accordance with liquid property information of a discharged solution. The term "liquid property" used herein refers to viscosity polarity, contact angle, and the like. Due to differences in viscosity, polarity, contact angle, and the like of a discharged liquid, intermolecular forces of the specimen 33 and the reagent 32 are also different. In this case, a liquid arrival height of the discharge liquid and a liquid flow state of the discharged liquid relative to the reaction liquid 36 that is a mixed liquid of the specimen 33 and the reagent 32 at the time of discharging are different depending on the liquid property. In a seventh embodiment, the liquid property of the solution and the change rate a of the distance Da that is suitable to obtain a large stirring effect at the time of discharging are recorded in association with each other as data in the memory 6 in advance. Alternatively, a user may input viscosity information, contact angle information, and the like of a reagent serving as an analysis item to the analysis control unit 8 via the keyboard 2 at the time of requesting the analysis item before the start of a measurement. Other configurations are the same as those according to the first embodiment.

Before the dispensing probe 30 starts discharging, the analysis control unit 8 reads the change rate a corresponding to the liquid property of the solution from the memory 6. Then, the analysis control unit 8 controls an appropriate lifting speed of the dispensing probe 30 which will obtain a large stirring effect at the time of discharging. Regarding viscosity information, the computer 3 can acquire a pressure waveform at the time of aspirating the specimen 33 and at the time of aspirating the reagent 32, analyze viscosity of the specimen 33 and the reagent 32 based on the pressure waveform, and input an analysis result to the analysis control unit 8.

In the automatic analyzer 10 according to the seventh embodiment, it is possible to efficiently stir the specimen 33 and the reagent 32 that are different liquids when the specimen 33 and the reagent 32 are simultaneously discharged by changing the lifting speed of the dispensing probe 30 according to the liquid property of the solution.

Experimental Example

Hereinafter, the effect of improving stirring efficiency at the time of simultaneously discharging a specimen and a reagent in the present embodiment will be described using experimental results. The following experimental results are used to describe the effect of the present embodiment, and a technical scope of the invention is not limited by the following experimental results.

An experiment was performed using the automatic analyzer 10 according to the first embodiment. The following two conditions were used. According to the condition of the first embodiment, after lifting of the dispensing probe 30 was started, the lifting speed of the dispensing probe 30 was controlled such that the distance Da between the tip end of the dispensing probe 30 and the liquid level of the reaction liquid 36 increased with an elapsed time. According to a condition in a comparative example, after lifting of the dispensing probe 30 was started, the lifting speed of the dispensing probe 30 was controlled such that the distance Da between the tip end of the dispensing probe 30 and the liquid level of the reaction liquid 36 was constant regardless of an elapsed time, and a state in which the tip end of the dispensing probe was immersed by 2 mm from the liquid level of the reaction liquid 36 was maintained. After the specimen 33 and the reagent 32 are simultaneously discharged, stirring such as pipette stirring or stirring using ultrasonic waves is not performed.

An aqueous solution to which a dye was added was used as the specimen 33, and a colorless and transparent solution having viscosity was used as the reagent 32. The specimen 33 and the reagent 32 were simultaneously discharged, and light absorbance (specific light absorbance of the dye used as the specimen) after a predetermined elapsed time was measured. A deviation rate (%) from light absorbance at the time of complete mixing was calculated based on the measured light absorbance and light absorbance in a state where the specimen and the dye were completely mixed. A lower deviation rate (%) indicates that a state of stirring performed by discharging only is close to a completely mixed state. That is, it can be said that stirring can be more efficiently performed by a discharge operation as the deviation rate (%) decreases.

Further, the light absorbance was measured every certain period of time immediately after discharging, and a light absorbance fluctuation rate (%) for 5 minutes was calculated. The light absorbance fluctuation rate (%) for 5 minutes indicates a ratio of a range of light absorbance data acquired for a plurality of times in 5 minutes (maximum light absorbance value minimum light absorbance value) to light absorbance 5 minutes after discharging. In a state in which stirring is not efficiently performed at the time of discharging, the light absorbance fluctuates due to a diffusion phenomenon of the specimen fa dye liquid) even after the end of discharging, and thus the light absorbance fluctuation rate (%) increases. That is, it can be said stirring can be more efficiently performed as the light absorbance fluctuation rate (%) for 5 minutes decreases.

Figure 17:
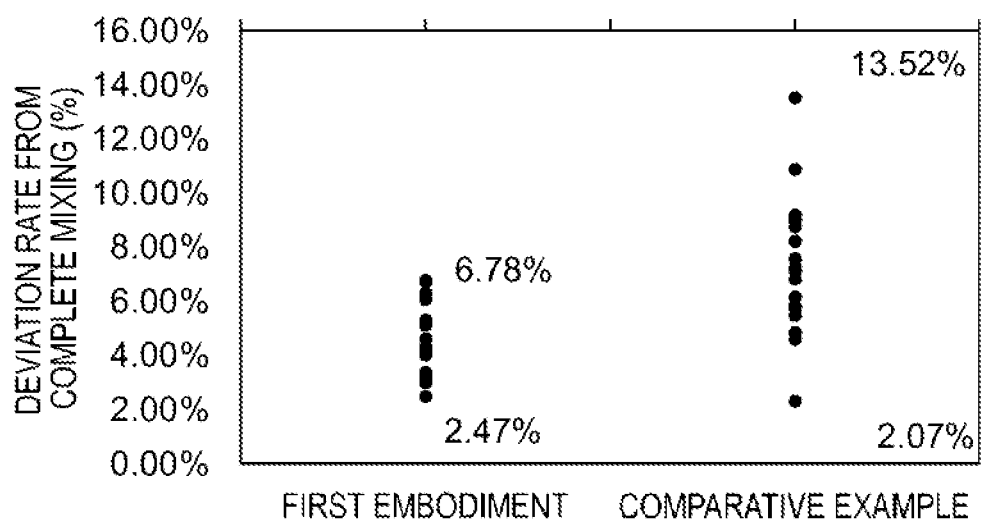
FIG. 17 is a diagram illustrating a deviation rate (%) for each of the first embodiment and a comparative example.

FIG. 17 is a diagram illustrating a deviation rate (%) for each of the first embodiment and the comparative example. A measurement is performed for a plurality of times under a condition of each of the first embodiment and the comparative example, and the deviation rate (%) is plotted. As can be seen from FIG. 17 according to the first embodiment, the deviation rate (%) from complete mixing is low, and fluctuation among multiple measurements is small.

Figure 18:
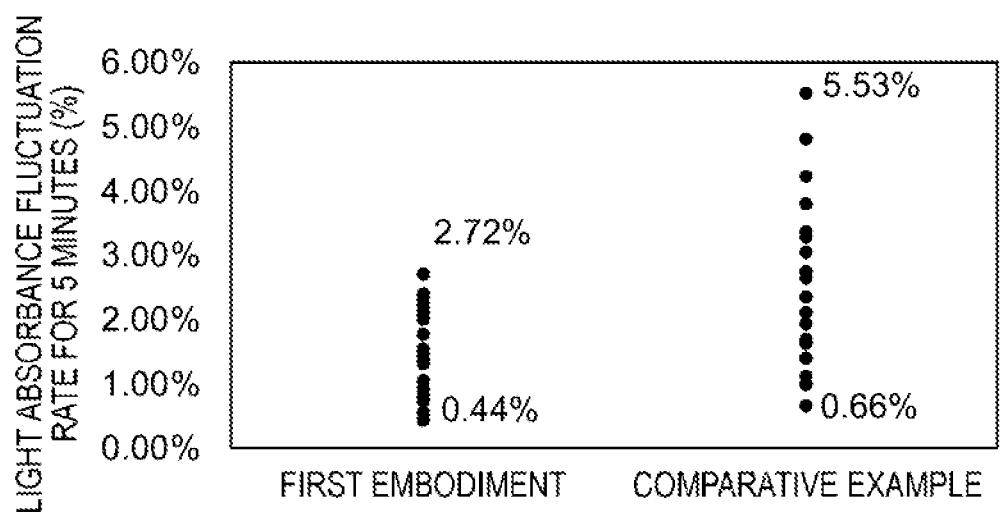
FIG. 18 is a diagram illustrating a light absorbance fluctuation rate fix 5 minutes for each of the first embodiment and the comparative example.

FIG. 18 is a diagram illustrating a light absorbance fluctuation rate (%) for 5 minutes for each of the first embodiment and the comparative example. A measurement is performed for a plurality of times under the condition of each of the first embodiment and the comparative example, and the light absorbance fluctuation rate (%) is plotted. As can be seen from FIG. 18, according to the first embodiment, the light absorbance fluctuation rate (%) is low, and fluctuation among measurements is small. Therefore, it can be understood that stirring can be performed more efficiently at the time of discharging in the first embodiment. That is, after lifting of the dispensing probe 30 is started, when the lifting speed of the dispensing probe 30 is controlled such that the distance Da between the tip end of the dispensing probe 30 and the liquid level of the reaction liquid 36 increases with an elapsed time, it is possible to efficiently stir a specimen and a reagent at the time of simultaneously discharging the specimen and the reagent.

Modifications of Invention

The invention is not limited to the embodiments described above, and includes various modifications. For example, the above-described embodiments are described in detail for easy understanding of the invention, and the invention is not necessarily limited to those including all the configurations described above. A part of a configuration of one embodiment can be replaced with a configuration of another embodiment, and the configuration of another embodiment can be added to the configuration of one embodiment. A part of a configuration of each embodiment can be added, deleted, or replaced with another configuration.

REFERENCE SIGNS LIST

1: analysis unit
2: keyboard
3: computer
4: printer
5: display device
6: memory
7: A/D converter
8: analysis control unit
11: dispensing mechanism
12: light source
13: spectroscopic detector
14: reaction vessel
15: reaction disk
21: reagent disk
22: reagent vessel
24: specimen vessel
25: sample rack
26: dispensing mechanism washing unit
30: dispensing probe
31: system water
32: reagent
33: specimen
36: reaction liquid
41: dispensing arm
42: vertical rotation operation unit
43: plunger
44: drive unit
45: metering pump
46: pump
47: dispensing flow path
48: liquid level detector
49: valve

The invention claimed is:

1. A device for preparing a specimen for an automatic analyzer, the device comprising:
    a probe configured to aspirate and discharge the specimen and a reagent via a tip end of the probe; and
    a control unit that is coupled to the probe, wherein the control unit is configured to:
        form a first air layer within the probe by aspirating air into the probe and then aspirating the reagent into the probe, wherein the first air layer is a barrier between the reagent and working fluid in the probe,
        form, after forming the first air layer, a second air layer within the probe by aspirating the air into the probe and then aspirating the specimen into the probe, wherein the second air layer is a barrier between the reagent and the specimen,
        discharge the specimen and the reagent from the probe into a vessel,
        determine a time change of a discharge amount using a discharge speed of the discharge amount and a duration of discharge of the reagent and the specimen discharged into the vessel,
        detect a height of a liquid surface level of the reagent and the specimen discharged into the vessel, wherein the height of the liquid surface is detected using at least a dimension of a reaction vessel and the time change of the discharge amount,
        continuously determine a distance between the tip end of the probe and the liquid surface based on at least the height of the liquid surface and the discharge amount of the specimen and the reagent from the probe into the vessel, wherein the distance is above the liquid surface, and
        lift the probe while the specimen and the reagent are discharged so that, the distance between the liquid surface and the tip end of the probe is increased while the specimen and the reagent are discharged.

2. The device according to claim 1, wherein the control unit is further configured to:
    discharge the specimen from the probe to the vessel after the tip end of the probe is moved below an inlet of the vessel, and
    not move the probe in a vertical direction while the probe discharges the specimen to the vessel.

3. The device according to claim 1, wherein subsequent to the distance being increased, the control unit is further configured to:
    decrease the distance while the discharge of the specimen and the reagent is completed.

4. The device according to claim 3, wherein the control unit is further configured to:
    decrease the distance by fixing a position of the probe in a height direction.

5. The device according to claim 3, wherein the control unit is further configured to:
    lift the probe so that the tip end of the probe is immersed below the liquid surface when the discharge is complete.

6. The device according to claim 5, wherein the control unit is further configured to output an alert when the tip end of the is above the liquid surface when the discharge is completed.

7. The device according to claim 3, wherein the control unit is further configured to:
    finish the discharge when the probe is at a fixed position.

8. The device according to claim 1, wherein the control unit is further configured to
    before the probe starts the discharge the specimen, lower the probe to a height within 1 mm above the liquid surface when the probe finishes the discharge.

9. The device according to claim 1, further comprising:
    a storage unit that stores data describing liquid characteristics of the specimen or liquid characteristics of the reagent,
    wherein the control unit controls a lifting rate of the probe according to the liquid characteristics described in the data.

10. The device according to claim 9, wherein
the liquid characteristics include at least one of viscosity or a contact angle.

* * * * *